(12) United States Patent
Aso et al.

(10) Patent No.: US 8,141,541 B2
(45) Date of Patent: Mar. 27, 2012

(54) ABNORMALITY DETECTION DEVICE FOR INTERNAL COMBUSTION ENGINE

(75) Inventors: Koji Aso, Susono (JP); Kazuhiro Wakao, Susono (JP); Takashi Nishikiori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 279 days.

(21) Appl. No.: 12/676,306

(22) PCT Filed: Jan. 9, 2009

(86) PCT No.: PCT/JP2009/050237
§ 371 (c)(1),
(2), (4) Date: Mar. 3, 2010

(87) PCT Pub. No.: WO2010/079615
PCT Pub. Date: Jul. 15, 2010

(65) Prior Publication Data
US 2011/0132327 A1    Jun. 9, 2011

(51) Int. Cl.
*F02D 13/02* (2006.01)
*F02D 45/00* (2006.01)
*F02D 17/02* (2006.01)
(52) U.S. Cl. ................. 123/436; 123/90.15; 123/406.29
(58) Field of Classification Search .................. 123/436, 123/406.29, 406.45, 90.11, 90.15, 90.17, 123/198 F
See application file for complete search history.

(56) References Cited

U.S. PATENT DOCUMENTS

| | | | | |
|---|---|---|---|---|
| 5,230,315 A | * | 7/1993 | Kanesaka | 123/403 |
| 6,848,422 B2 | * | 2/2005 | Hashizume et al. | 123/90.15 |

FOREIGN PATENT DOCUMENTS

| | | |
|---|---|---|
| JP | 11-141364 | 5/1999 |
| JP | 2001-164975 A | 6/2001 |
| JP | 2001-271666 A | 10/2001 |
| JP | 2003-184595 A | 7/2003 |
| JP | 2004-068617 A | 3/2004 |
| JP | 2004-100486 A | 4/2004 |
| JP | 2004-100487 A | 4/2004 |
| JP | 2005-139962 A | 6/2005 |

* cited by examiner

*Primary Examiner* — Hieu T Vo
(74) *Attorney, Agent, or Firm* — Kenyon & Kenyon LLP

(57) ABSTRACT

An object of the present invention is to provide an abnormality detection device that is used with an internal combustion engine having a valve drive mechanism capable of halting the drive of at least one of an intake valve and an exhaust valve, and able to detect the abnormalities of a valve drive halt function. The internal combustion engine includes a knock sensor capable of sensing the seating sound of the intake valve and/or the exhaust valve. An ECU detects whether a control signal given to the valve drive mechanism is a valve drive signal or a valve halt signal. In accordance with the result of detection by the ECU and the presence of the seating sound in an output of the knock sensor, the abnormality detection device judges whether or not the valve drive mechanism is abnormal.

11 Claims, 23 Drawing Sheets

ABNORMALITY DETECTION DEVICE FOR INTERNAL COMBUSTION ENGINE

This is a 371 national phase application of PCT/JP2009/050237 filed 9 Jan. 2009, the contents of which are incorporated herein by reference.

TECHNICAL FIELD

The present invention relates to an abnormality detection device for an internal combustion engine.

BACKGROUND ART

An internal combustion engine includes a valve drive mechanism for driving an intake valve and an exhaust valve. Abnormality detection devices disclosed, for instance, in Patent Documents 1 to 4, detect a malfunction of the intake valve or exhaust valve, that is, an abnormality of the valve drive mechanism.

The device disclosed in Patent Document 1 includes a lift sensor that detects the lift amount of the intake valve or exhaust valve, which may be hereinafter collectively referred to as an "intake/exhaust valve." The device disclosed in Patent Document 1 directly detects a malfunction of an intake/exhaust valve in accordance with an output of the lift sensor. The device disclosed in Patent Document 2 detects a failure of a cylinder halt mechanism, which halts the drive of the intake/exhaust valve, in accordance with an intake air amount. The device disclosed in Patent Document 3 indirectly detects a malfunction of the intake/exhaust valve in accordance with an exhaust gas sensor output.

Patent Document 1: JP-A-2004-100487
Patent Document 2: JP-A-2005-139962
Patent Document 3: JP-A-2004-100486
Patent Document 4: JP-A-11-141364

SUMMARY OF INVENTION

Technical Problem

As described above, there are various known abnormality detection devices for detecting the abnormalities of the valve drive mechanism. However, these abnormality detection devices have their own drawbacks. The device disclosed in Patent Document 1 requires a lift sensor that is exclusively used for lift amount measurements. The addition of a dedicated sensor may cause a cost increase. The devices disclosed in Patent Documents 2 and 3 detect a mechanical failure of the intake/exhaust valve in accordance with an intake air amount, an exhaust gas air-fuel ratio, or other indirect information. The valve drive function of either one of the intake and exhaust valves may be abnormal while the valve drive function of the other valve is normal. As the device disclosed in Patent Document 3 is based on an exhaust gas sensor output, it cannot determine whether the intake valve is halted when the exhaust valve is halted, that is, closed. Similarly, it is difficult for the device disclosed in Patent Document 2 to detect whether the intake valve and exhaust valve of a halted cylinder are both halted (closed) normally.

As described above, the conventional technologies for detecting the abnormalities of the valve drive mechanism have advantages and disadvantages. Therefore, research and development activities are continued in order to obtain an excellent abnormality detection device. The inventor of the present invention has conducted intensive studies, taken an approach different from those applied thus far, and devised a device capable of detecting the abnormalities of the valve drive mechanism.

The present invention has been made to solve the above problem. An object of the present invention is to provide an abnormality detection device that is used with an internal combustion engine having a valve drive mechanism capable of halting the drive of at least one of an intake valve and an exhaust valve, and able to detect the abnormalities of a valve drive halt function.

Another object of the present invention is to provide an internal combustion engine capable of detecting the abnormalities of the valve drive halt function.

A knock sensor described in Patent Document 4 detects a vibration that occurs when an electromagnetic valve is driven. More specifically, Patent Document 4 states that a valve opening/closing timing is calculated in accordance with a comparison between a crank angle and the information about the vibration detected by the knock sensor. However, Patent Document 4 does not contain a description of valve drive halt control.

Solution to Problem

To achieve the above-mentioned purpose, a first aspect of the present invention is an abnormality detection device for detecting an abnormality in an internal combustion engine having a knock sensor and a valve drive mechanism for driving an intake valve and an exhaust valve, the knock sensor being capable of sensing a seating sound of the intake valve and/or the exhaust valve, the valve drive mechanism being capable of halting at least one of the intake valve and the exhaust valve, the abnormality detection device comprising:

instruction detection means for detecting whether a control signal issued to the valve drive mechanism is a valve drive signal or a valve halt signal; and judgment means for judging, in accordance with the result of detection by the instruction detection means and the presence of the seating sound in an output of the knock sensor, whether or not the valve drive mechanism is abnormal.

A second aspect of the present invention is the abnormality detection device for the internal combustion engine according to the first aspect, wherein the internal combustion engine includes a plurality of cylinders equipped with an ignition plug, the abnormality detection device further comprising:

ignition control means for changing the ignition timing of the ignition plug or inhibiting the ignition of the ignition plug so that the seating timings of the intake valve and the exhaust valve do not coincide with the ignition timing of the ignition plug; and output acquisition means for acquiring the output of the knock sensor after the ignition control means changes the ignition timing or inhibits the ignition;

wherein the judgment means judges, in accordance with the presence of the seating sound in the knock sensor output acquired by the output acquisition means, whether or not the valve drive mechanism is abnormal.

A third aspect of the present invention is the abnormality detection device for the internal combustion engine according to the first aspect or the second aspect, wherein the internal combustion engine includes a plurality of intake valves and a plurality of exhaust valves, the valve drive mechanism being a variable valve train capable of changing the valve opening characteristics of the plurality of intake valves and the plurality of exhaust valves, the abnormality detection device further comprising:

phase change means for changing the phase of a valve so that the seating timings of the plurality of intake valves and the plurality of exhaust valves do not coincide with each other; and output acquisition means for acquiring the output of the knock sensor after the phase change means changes the phase;

wherein the judgment means judges, in accordance with the presence of the seating sound in the knock sensor output acquired by the output acquisition means, whether or not the valve drive mechanism is abnormal.

A fourth aspect of the present invention is the abnormality detection device for the internal combustion engine according to the third aspect, wherein the phase change means includes seating timing adjustment means, which adjusts the seating timings of two of the plurality of intake valves and the plurality of exhaust valves that are close to each other in terms of seating timing until the seating timing difference between the two valves is greater than a predetermined amount.

A fifth aspect of the present invention is the abnormality detection device for the internal combustion engine according to any one of the first to fourth aspects, further comprising:

periodic output acquisition means for acquiring the knock sensor output generated at the seating timing of the intake valve and/or the exhaust valve at a plurality of timings that differ from each other by a crank angle equivalent to an integer multiple of one cycle; and comparative detection means for determining the presence of the seating sound in a knock sensor output by comparing knock sensor outputs that are acquired by the periodic output acquisition means at a plurality of timings.

A sixth aspect of the present invention is the abnormality detection device for the internal combustion engine according to the fifth aspect, wherein the valve drive mechanism includes a camshaft that rotates in synchronism with a crankshaft of the internal combustion engine, and a cam mechanism that transmits the rotation of the camshaft to open or close the intake valve and the exhaust valve.

A seventh aspect of the present invention is the abnormality detection device for the internal combustion engine according to any one of the first to sixth aspects, wherein the internal combustion engine includes a plurality of cylinders each having an intake valve and an exhaust valve, and wherein the judgment means determines the presence of the seating sound by comparing the knock sensor output against a predetermined threshold value, the abnormality detection device further comprising:

threshold value storage means for storing a plurality of different threshold values for judgment by the judgment means; and threshold value selection means for selecting threshold values for judgment by the judgment means from the plurality of threshold values stored by the threshold value storage means in a manner appropriate for the individual intake valves and exhaust valves of each of the plurality of cylinders.

An eighth aspect of the present invention is the abnormality detection device for the internal combustion engine according to any one of the first to seventh aspects, further comprising:

learning means which, while at least one of the intake valve and exhaust valve is being driven by the valve drive mechanism, acquires a learned value by learning the maximum amplitude of an output waveform of the knock sensor at a valve closing timing of the at least one driven valve;

wherein the judgment means determines the presence of the seating sound of the intake valve and the presence of the seating sound of the exhaust valve by comparing the knock sensor output value against the learned value.

A ninth aspect of the present invention is the abnormality detection device for the internal combustion engine according to the eighth aspect, wherein the internal combustion engine includes a valve group having a plurality of intake valves and a plurality of exhaust valves; wherein the valve drive mechanism is capable of halting the drive of the individual valves in the valve group; wherein the learning means acquires learned values concerning the individual valves in the valve group; and wherein the judgment means checks each valve in the valve group for the presence of the seating sound in the knock sensor output by comparing the knock sensor output against a plurality of learned values that are acquired when the learning means learns each valve.

A tenth aspect of the present invention is an internal combustion engine comprising:

a valve drive mechanism which is capable of driving an intake valve and an exhaust valve of the internal combustion engine, receiving a valve drive signal and a valve halt signal, and halting the drive of at least one of the intake valve and the exhaust valve in accordance with the received signals;

a knock sensor which is incorporated in the internal combustion engine to sense the seating sound of the intake valve and/or the exhaust valve;

fuel cut means which performs a fuel cut for the internal combustion engine;

valve halt control means which selectively inputs the valve drive signal and the valve halt signal into the valve drive mechanism so as to keep the intake valve and/or the exhaust valve closed during the fuel cut;

the abnormality detection device for the internal combustion engine according to any one of claims 1 to 9; and abnormality detection control means which causes the abnormality detection device to check for an abnormality in the valve drive mechanism after the valve halt signal is input into the valve drive mechanism by the valve halt control means.

An eleventh aspect of the present invention is an internal combustion engine comprising:

a valve drive mechanism which is capable of driving an intake valve and an exhaust valve of the internal combustion engine, receiving a valve drive signal and a valve halt signal, and halting the drive of at least one of the intake valve and the exhaust valve in accordance with the received signals;

a knock sensor which is incorporated in the internal combustion engine to sense the seating sound of the intake valve and/or the exhaust valve;

fuel cut means which performs a fuel cut for the internal combustion engine;

valve halt control means which inputs the valve halt signal into the valve drive mechanism so as to keep the intake valve and/or the exhaust valve closed during the fuel cut;

valve restoration control means which, upon receipt of a fuel cut termination instruction, inputs the valve drive signal into the valve drive mechanism so that the intake valve and/or the exhaust valve resume a valve opening operation;

the abnormality detection device for the internal combustion engine according to any one of claims 1 to 9; and abnormality detection control means which causes the abnormality detection device to check for an abnormality in the valve drive mechanism during a period after the valve drive signal is input into the valve drive mechanism by the valve restoration control means and before the internal combustion engine resumes a fuel injection operation.

Advantageous Effects of Invention

According to the first aspect of the present invention, it is possible to detect the abnormalities of the valve drive mechanism included in the internal combustion engine. While the intake valve or exhaust valve is being driven, it emits a seating sound (collision sound) when it hits a cylinder head. If the valve drive mechanism halts the valve in compliance with a valve halt signal, the output of a knock sensor does not possibly contain the seating sound. If, on the contrary, the valve drive mechanism places the valve in a driven state (non-halt state) in compliance with a valve drive signal, the output of the knock sensor should contain the seating sound. Therefore, the abnormalities of the valve drive mechanism of the internal combustion engine can be detected in accordance with the control exercised on the valve drive mechanism and depending on whether the output of the knock sensor contains the seating sound.

According to the second aspect of the present invention, it is possible to ensure that the knock sensor's detection of the seating sound is not obstructed by a noise generated upon ignition.

According to the third aspect of the present invention, the seating sound, on which a judgment of the judgment means is based, can be sensed in such a manner as to identify the valve from which the seating sound is emitted.

According to the fourth aspect of the present invention, it is possible to ensure that the seating timings of the valves do not coincide with each other.

According to the fifth aspect of the present invention, the presence of the seating sound can be accurately determined by making use of the periodicity of a valve operation based on the crank angle. More specifically, the seating timing of a valve is periodic and based on the crank angle. Therefore, the generation and cessation of the seating sound, which are based on control instructions for the valve drive mechanism, can be detected by comparing a plurality of knock sensor outputs whose crank angles differ by an amount equal to an integral multiple of one cycle. In addition, output variations based on the generation and cessation of the seating sound can be identified by comparing the knock sensor outputs as described above. This provides an advantage in that the judgment of the seating sound is not significantly affected by noise.

According to the sixth aspect of the present invention, the valve drive mechanism according to the fifth aspect of the present invention is a mechanical drive type valve drive mechanism that rotationally drives a camshaft to open/close a valve. When this type of valve drive mechanism is used, the periodicity of a valve operation relative to the crank angle is assured with high reliability. Therefore, high judgment accuracy is guaranteed when the knock sensor outputs are compared in accordance with the sixth aspect of the present invention.

According to the seventh aspect of the present invention, it is possible to make highly accurate judgments in which the seating sound difference between the valves is reflected. The loudness of the valve seating sound may vary depending on the difference in the positional relationship between individual valves and knock sensors in a cylinder block. As the seventh aspect of the present invention stores a plurality of different threshold values, an appropriate threshold value can be selected from the stored ones. This makes it possible to make highly accurate judgments in which the seating sound difference between the valves is reflected.

According to the eighth aspect of the present invention, a value for determining the presence of the valve seating sound can be learned in accordance with the knock sensor output.

According to the ninth aspect of the present invention, the presence of the valve seating sound can be determined with high accuracy while the knock sensor output is generated. In an internal combustion engine, the loudness of the valve seating sound varies from one valve to another due, for instance, to the individual variability and mounting position of the valves. As the eighth aspect of the present invention provides a learned value for each valve, it is possible to make highly accurate judgments in which the seating sound difference between the valves is reflected.

According to the tenth aspect of the present invention, it is possible to detect whether an intake/exhaust valve is halted normally during a fuel cut.

According to the eleventh aspect of the present invention, it is possible to detect whether an intake/exhaust valve drive operation is resumed normally after termination of a fuel cut.

Figure 1:
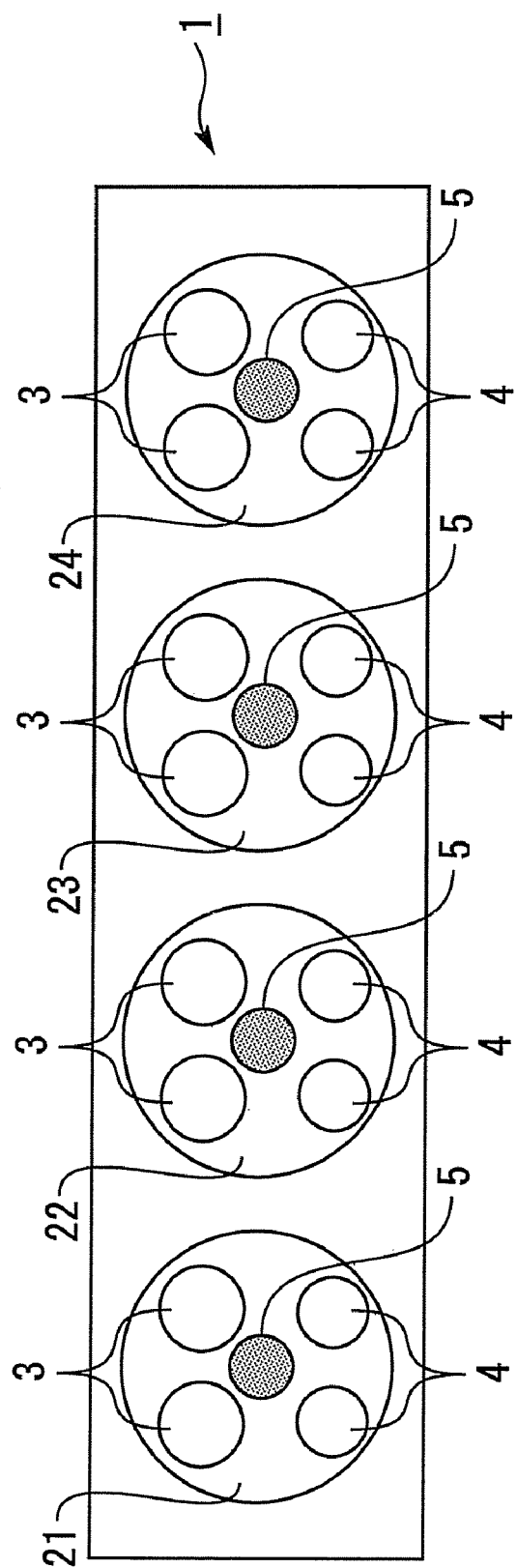
FIG. 1 is a schematic diagram illustrating a configuration of an internal combustion engine described in Japanese Patent Application No. 2008-122616.

REFERENCE SIGNS LIST 208 internal combustion engine
210 cylinder block
212 knock sensor
214 valve drive mechanism
216 external control circuit
218 ignition plug
222 crank angle sensor

DESCRIPTION OF EMBODIMENTS

First Embodiment

[Configuration of First Embodiment]

Figure 24:
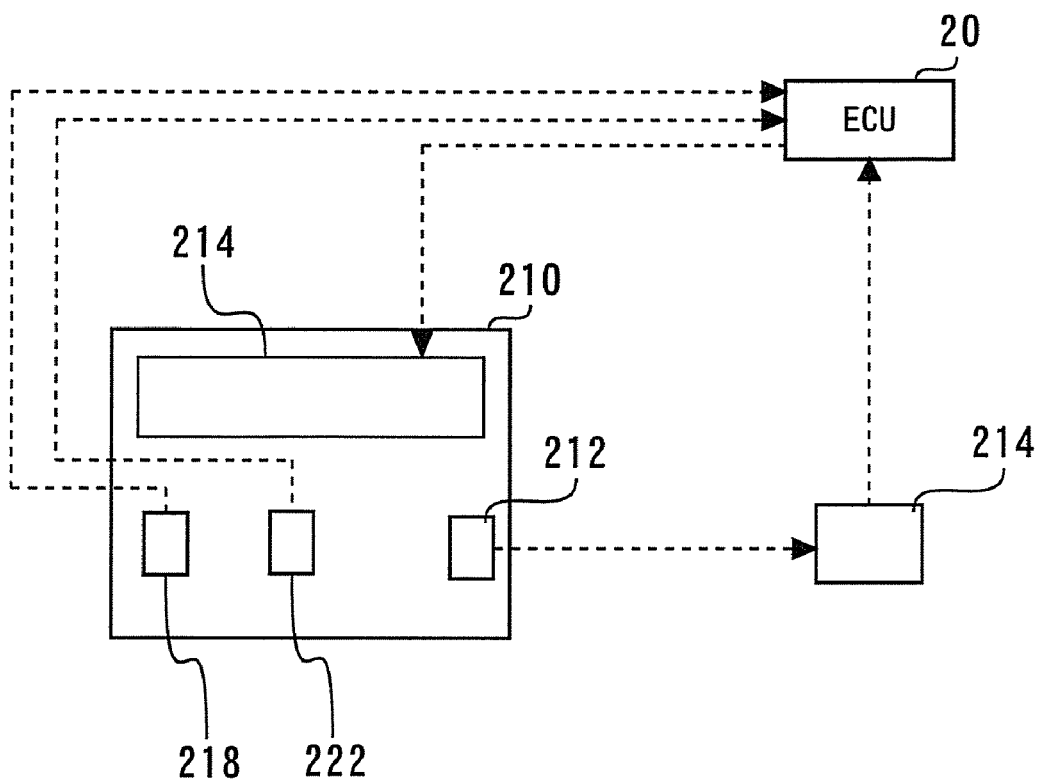
FIG. 24 is a schematic diagram illustrating an overall configuration of an abnormality detection device according to a first embodiment of the present invention.

FIG. 24 is a schematic diagram illustrating the overall configurations of an abnormality detection device according to a first embodiment of the present invention and an internal combustion engine 208 in which the abnormality detection device is mounted. The internal combustion engine 208 according to the first embodiment is suitable for use as a vehicle-mounted type. The internal combustion engine 208 includes a cylinder block 210. The cylinder block 210 includes four in-line cylinders (not shown). The cylinder block 210 also includes a crankshaft that is coupled to a piston provided in each of the four cylinders.

The internal combustion engine 208 also includes a valve drive mechanism 214 that drives an intake valve and exhaust valve of each cylinder. The valve drive mechanism 214 includes a camshaft and a mechanism for transmitting the rotation of the camshaft to the intake valve and exhaust valve (this mechanism may be hereinafter referred to as the "cam mechanism" for the sake of convenience). While the internal combustion engine 208 is running (or, more specifically, during a fuel cut), the valve drive mechanism 214 can keep the intake valve and exhaust valve of each cylinder closed. A valve that is kept closed may be hereinafter referred to as a "halted valve." When the term "valve" is used subsequently, it basically means either an intake valve or an exhaust valve. The present embodiment assumes that the valve drive mechanism 214 is implemented by a valve drive mechanism disclosed in Japanese Patent Application No. 2008-122616. The valve drive mechanism disclosed in Japanese Patent Application No. 2008-122616 is shown at the end of this document.

A cylinder head (not shown in FIG. 24) of the cylinder block 210 includes a fuel injection valve and an ignition plug 218, which are provided for each cylinder. FIG. 24 schematically shows the ignition plug 218 as a block. In reality, however, the cylinder head of the cylinder block 210 includes a total of four ignition plugs, one for each cylinder.

The cylinder block 210 includes a knock sensor 212. The knock sensor 212 is a nonresonant knock sensor (which may be also referred to as a "flat-type knock sensor"). This type of knock sensor is generally capable of sensing vibrations within a wide frequency range including a knock frequency. An output signal of the knock sensor 212 enters an external control circuit 216. The external control circuit 216 has a knock window function and a bandpass filter function. These functions are exercised to detect vibration components, which are generated upon knocking, from the output signal of the knock sensor 212.

The external control circuit 216 is connected to an ECU (Electronic Control Unit) 20. The ECU 220 can acquire the output of the knock sensor 212 via the external control circuit 216. In the first embodiment, the internal combustion engine 208 includes a crank angle sensor 222. The ECU 220 can calculate a crank angle in accordance with an output of the crank angle sensor 222.

The ECU 220 issues a control signal to the valve drive mechanism 214 in accordance with the operating status of the internal combustion engine 208 for the purpose of switching the intake valve and exhaust valve of each cylinder between a driven (operating) state and a halt state. Control exercised to switch the intake valve and exhaust valve from the driven state to the halt state may be hereinafter referred to as "valve halt control." On the contrary, control exercised to switch the intake valve and exhaust valve from the halt state to the driven state may be hereinafter referred to as "valve restoration control." In the present embodiment, control signals generated by the ECU 220 during valve halt control and valve restoration control are given to a first actuator 91 and a second actuator 92 of the valve drive mechanism disclosed in Japanese Patent Application No. 2008-122616.

In the first embodiment, the ECU 220 can exercise fuel cut control as needed to stop a fuel injection to the internal combustion engine 208. The description of a fuel cut is omitted here because it is not a novel operation and can be performed by using a known technology. Valve halt control and valve restoration control can be exercised when, for instance, a fuel cut operation for the internal combustion engine 208 starts or ends.

[Operation of First Embodiment]

The abnormality detection device according to the first embodiment uses the output of the knock sensor 212 to detect an abnormality of the valve drive mechanism 214 as described below. The intake valve and exhaust valve driven by the valve drive mechanism 214 emit a seating sound during a valve opening/closing operation. The "seating sound" is a collision sound that a valve generates when it closes (i.e., becomes seated) and hits the cylinder head of the cylinder block 210. For the sake of explanation, the seating sound may be referred to as the "valve seating sound" as needed.

When the seating sound is emitted, the quiver (vibration and shock) of the cylinder block 210 is transmitted to the knock sensor 212 mounted on the cylinder block 210. Therefore, an output waveform of the knock sensor 212 reveals an output change that is caused by the seating of a valve. In this manner, the knock sensor 212 can sense the seating sound. As the original purpose of the knock sensor is to detect a knock, it can be said that the above-described output change is a noise (seating noise) for the knock sensor 212.

When valve halt control is exercised, the ECU 220 issues a control signal to the valve drive mechanism 214 in order to halt the intake valve and exhaust valve. When the valve drive mechanism 214 halts the intake valve and exhaust valve in accordance with the control signal, no seating sound should appear in the output of the knock sensor 212. Therefore, if the seating sound is revealed by the output of the knock sensor 212 after valve halt control is exercised, the first embodiment concludes that the valve drive mechanism 214 is abnormal.

When, on the other hand, valve restoration control is exercised, the ECU 220 issues a control signal to the valve drive mechanism 214 in order to drive the intake valve and exhaust valve. When the valve drive mechanism 214 resumes driving the intake valve and exhaust valve in accordance with the control signal, the seating sound should appear in the output of the knock sensor 212. Therefore, if no seating sound is revealed by the output of the knock sensor 212 after valve restoration control is exercised, the first embodiment concludes that the valve drive mechanism 214 is abnormal.

The first embodiment, which is described above, makes it possible to detect whether the valve drive mechanism 214 operates normally in accordance with valve halt control and valve restoration control.

[Details of Process Performed in First Embodiment]

Figure 25:
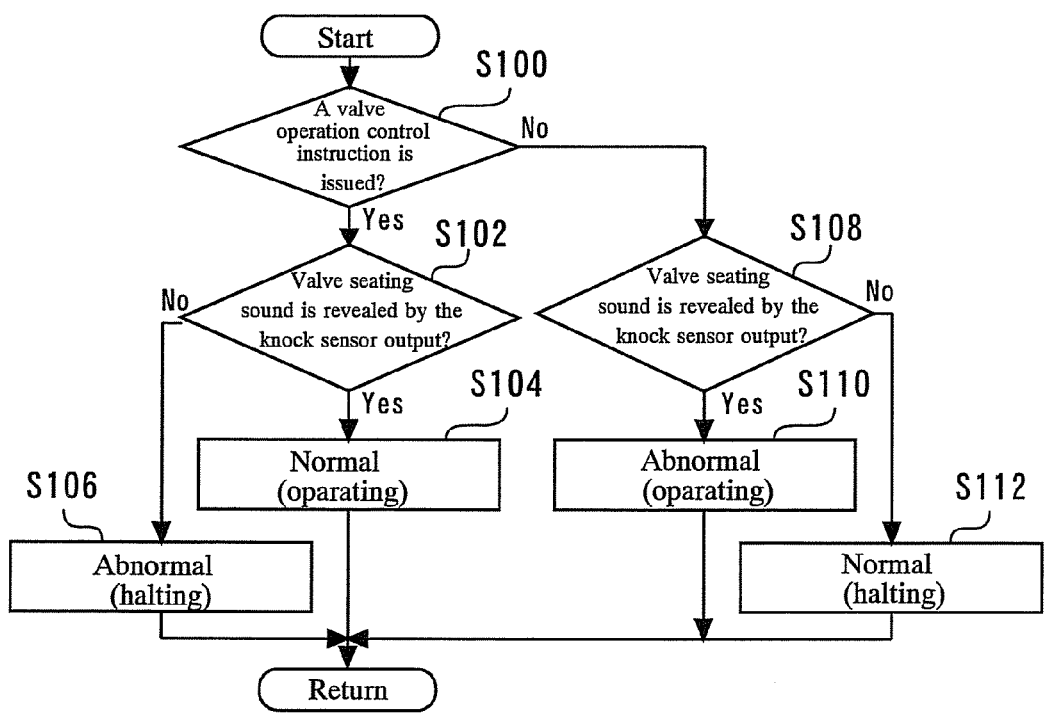
FIG. 25 is a flowchart illustrating a routine that ECU 220 executes in accordance with a first embodiment of the present invention.

A process performed in the first embodiment to detect an abnormality of the valve drive mechanism 214 will now be described in detail. FIG. 25 is a flowchart illustrating a routine that the ECU 220 executes in accordance with the first embodiment.

The present embodiment assumes that the process shown in FIG. 25 is performed when a fuel cut operation for the internal combustion engine 208 starts and when the fuel cut operation ends (when fuel injection control is resumed at the end of the fuel cut operation). More specifically, the present embodiment first judges whether a fuel cut condition for the internal combustion engine 208 is established (whether a fuel cut execution flag is ON or OFF). When the fuel cut execution flag is ON, fuel cut control starts so that the ECU 220 exercises valve halt control. When valve halt control is exercised, the ECU 220 issues a control signal to the valve drive mechanism 214 in order to halt the intake valve and exhaust valve. It is assumed that the routine shown in FIG. 24 is initiated after the issuance of the control signal. If a fuel cut restoration condition is established during a fuel cut operation, the present embodiment causes the ECU 220 to exercise valve restoration control. It is assumed that the routine shown in FIG. 24 is initiated after such valve restoration control.

The routine shown in FIG. 24 first judges whether a valve operation control instruction is issued (step S100). Step S100 is performed to identify a control signal issued to the valve drive mechanism 214, or more specifically, detect whether a valve drive signal or a valve halt signal is issued to the valve drive mechanism 214. The "valve halt signal" in the present embodiment is a control signal that is to be issued to the valve drive mechanism 214 when valve halt control is exercised. The "valve drive signal" in the present embodiment is a control signal that is to be issued to the valve drive mechanism 214 when valve halt control is not exercised. Step S100 is performed to detect the contents of the control signal that the ECU 220 has given to the valve drive mechanism 214. The present embodiment detects control signals given to the first and second actuators 91, 92 of the valve drive mechanism disclosed in Japanese Patent Application No. 2008-122616.

If the ECU 220 issues a control signal for driving the intake valve and exhaust valve to the valve drive mechanism 214, the condition of step S100 is established. In this instance, the routine proceeds to step S102. If, on the other hand, the ECU 220 issues a control signal for halting the intake valve and exhaust valve, that is, if valve halt control is exercised, the condition of step S100 is negated. In this instance, the routine proceeds to step S108.

If the condition of step S100 is established, the routine performs step S102 to judge whether the valve seating sound is revealed by the knock sensor output. If the knock sensor output exceeds a predetermined threshold value, the present embodiment concludes that the valve seating sound is emitted. The magnitude of the threshold value may be predetermined through an experiment or the like so that the presence of the valve seating sound in the knock sensor output can be determined.

If the judgment result obtained in step S102 indicates that the valve seating sound is emitted, the routine proceeds to step S104 and concludes that the valve drive mechanism 214 is currently normal. As steps S102 and beyond are performed after the above-described judgment in step S100, a control signal for driving the valves is now issued to the valve drive mechanism 214. When the routine proceeds to step S104 upon completion of step S102, it means that the valve seating sound is confirmed in a situation where the valve drive mechanism 214 should drive the valves. Thus, step S104 is performed to conclude that the valve drive mechanism 214 is normal. Upon completion of step S104, the routine terminates.

If the judgment result obtained in step S102 does not indicate that the valve seating sound is emitted, the routine proceeds to step S106 and concludes that the valve drive mechanism 214 is abnormal. As mentioned in the preceding paragraph, the valve seating sound should normally be emitted while step S102 is performed. In step S106, therefore, the routine concludes that the valve drive mechanism 214 is abnormal. More specifically, the routine concludes in step S106 that the valve drive mechanism 214 has brought the valves to a halt without complying with a control instruction for operating the valves. Upon completion of step S106, the routine terminates.

If the condition of step S100 is negated, the routine proceeds to step S108 and judges whether the valve seating sound is revealed by the knock sensor output. In step S108, the same process is performed as in step S102 to determine the presence of the valve seating sound.

If the judgment result obtained in step S108 indicates that the valve seating sound is emitted, the routine proceeds to step S110 and concludes that the valve drive mechanism 214 is currently abnormal. In accordance with the judgment result obtained in step S100, which is described earlier, valve halt control is exercised while step S108 is performed. Therefore, no valve seating sound should be generated while step S108 is performed. Thus, the routine concludes in step S110 that the valve drive mechanism 214 is abnormal. Upon completion of step S110, the routine terminates.

If the judgment result obtained in step S108 does not indicate that the valve seating sound is emitted, the routine proceeds to step S112 and concludes that the valve drive mechanism 214 is normal. Upon completion of step S112, the routine terminates.

Performing the above-described process makes it possible to detect an abnormality of the valve drive mechanism 214 in accordance with the control exercised over the valve drive mechanism 214 and the presence of the valve seating sound in the output of the knock sensor 212.

In the first embodiment, which has been described above, the valve drive mechanism 214 corresponds to the "valve drive mechanism" according to the first aspect of the present invention; and the knock sensor 212 corresponds to the "knock sensor" according to the first aspect of the present invention. The "instruction detection means" according to the first aspect of the present invention is implemented in the first embodiment when the ECU 220 performs step S100 in the flowchart of FIG. 25. Further, the "judgment means" according to the first aspect of the present invention is implemented in the first embodiment when the ECU 220 selectively performs steps S102 to S106 and steps S108 to S112 in the flowchart of FIG. 25.

Further, in the first embodiment, the "fuel cut means" according to the tenth or eleventh aspect of the present invention is implemented when the ECU 220 exercises fuel cut control; and the "valve halt control means" according to the tenth or eleventh aspect of the present invention is implemented when the ECU 220 exercises valve halt control during a period of fuel cut control. Moreover, in the first embodiment, the "abnormality detection control means" according to the tenth aspect of the present invention is implemented when the ECU 220 begins to execute the routine shown in FIG. 24 after valve halt control as described under "Details of Process Performed in First Embodiment."

Furthermore, in the first embodiment, the "valve restoration control means" according to the eleventh aspect of the present invention is implemented when the ECU 220 exercises valve restoration control upon termination of a fuel cut operation. Moreover, in the first embodiment, the "abnormality detection control means" according to the eleventh aspect of the present invention is implemented when the ECU 220 begins to execute the routine shown in FIG. 24 after valve restoration control as described under "Details of Process Performed in First Embodiment."

Modifications of First Embodiment (First Modification)

It is assumed that the first embodiment detects abnormalities of the valve drive mechanism in an in-line four-cylinder internal combustion engine 208. However, the present invention is not limited town in-line four-cylinder internal combustion engine. The number and the arrangement of cylinders are not limited. More specifically, the present invention is applicable to an internal combustion engine that includes a valve drive mechanism capable of halting the drive of at least one of an intake valve and an exhaust valve, and a knock sensor capable of detecting the seating sound of the intake valve and/or the exhaust valve. The present invention is also applicable to a valve drive mechanism that selectively halts and drives the intake valve only or the exhaust valve only. In some cases, an in-line six-cylinder internal combustion engine may include two knock sensors. It goes without saying that the present invention can also be applied to an internal combustion engine having a plurality of knock sensors.

It is also assumed that the first embodiment uses the valve drive mechanism disclosed in Japanese Patent Application No. 2008-122616 shown at the end of this document. However, the present invention is not limited to the use of such a valve drive mechanism. The present invention can also be applied to a variable valve train capable of driving and halting the intake valve and exhaust valve of an internal combustion engine. More specifically, the present invention is also applicable to a variable valve train that is capable of simultaneously switching the intake valves and exhaust valves of all cylinders between a driven state and a halt state.

(Second Modification)

In the first embodiment, the output of the knock sensor 212 may be filtered so that a signal having the frequency of the valve seating sound is allowed to pass through. Various vibrations including the rotational vibration of the crankshaft or the like and the vibration arising from vertical piston motion are applied to the cylinder block. These noise components can be eliminated when the output of the knock sensor 212 is filtered. When the presence of the valve seating sound is to be determined without filtering, the following method may be used. For example, an experiment or the like may be first conducted to identify a pattern (e.g., a waveform pattern or the range of the magnitude of an output value) unique to an output that is generated from the knock sensor 212 when a valve becomes seated. Next, the presence of the valve seating sound may be determined by judging whether the unique pattern is revealed by the output value of the knock sensor 212.

(Third Modification)

The first embodiment uses one threshold value to judge whether the valve seating sound is revealed by the output of the knock sensor 212. However, the present invention is not limited to the use of one such threshold value. The loudness (intensity) of the valve seating sound may significantly vary depending on the difference in the positional relationship between individual valves and knock sensors in the cylinder block, as explained in connection with a later-described fifth embodiment. In a third modification, therefore, a threshold value is predetermined for each valve to let the ECU 220 store a plurality of such threshold values. Thus, the plurality of threshold values can be used to make a judgment about each valve. More specifically, the third modification may judge in accordance with a crank angle whether a threshold value predetermined for each valve is exceeded by the amplitude of the valve seating sound at the time of valve seating. However, it is not always necessary to prepare a threshold value for every valve. A plurality of valves may share one threshold value if their seating sounds do not significantly differ from each other in loudness (intensity).

In the third modification, which is described above, the "threshold value storage means" according to the seventh aspect of the present invention is implemented when the ECU 220 stores a plurality of threshold values. Further, in the third modification, the "threshold value selection means" according to the seventh aspect of the present invention is implemented when the ECU 220 selects a threshold value for a specific valve in accordance with the crank angle.

In the first embodiment, a cam angle sensor may be used instead of the crank angle sensor 222.

The abnormal detection device according to the present embodiment can be used for failure diagnosis (so-called OBD or On-board diagnosis) when the internal combustion engine 208 according to the present embodiment is mounted in a vehicle. For example, when the valve drive mechanism 214 is found to be abnormal, a warning lamp may be illuminated to alert a driver of the vehicle to such an abnormality.

The abnormality detection device according to the first embodiment has the following advantage over the device disclosed in Patent Document 1. The first embodiment uses the knock sensor 212 to detect a knock. Further, the first embodiment does not include a lift sensor that is used in the device disclosed in Patent Document 1 and dedicated to lift amount measurement. Therefore, no cost increase will take place due to the addition of such a dedicated sensor.

Further, the abnormality detection device according to the first embodiment has the following advantage over the devices disclosed in Patent Documents 2 and 3. The technologies described in Patent Documents 2 and 3 represent abnormality detection methods that are based, for instance, on the intake air amount and exhaust gas air-fuel ratio. On the other hand, the first embodiment makes an abnormality judgment depending on whether the seating sound is emitted. The seating sound is generated when a valve hits the cylinder head (cylinder block). Therefore, the abnormality detection device according to the first embodiment detects a valve operation more directly than the devices disclosed in Patent Documents 2 and 3.

Moreover, the valve drive function for either the intake valve or the exhaust valve may become faulty while the valve drive function for the other is normal. The device disclosed in Patent Document 3 detects an abnormality in accordance with the output of an exhaust gas sensor. Therefore, when an exhaust port is closed by the exhaust valve, it is difficult to detect in accordance with the exhaust gas sensor output whether the intake valve is normal or abnormal. Meanwhile, the device disclosed in Patent Document 2 detects an abnormality in accordance with an intake air amount. Therefore, if an intake port is closed by the intake valve, it is difficult to detect in accordance with the intake air amount, or more specifically, the output of an air flow meter or an intake sensor such as an intake pressure sensor, whether the exhaust valve is normal or abnormal. As described above, when the technologies disclosed in Patent Documents 2 and 3 are used, the path between the valve to be detected and the sensor on which abnormality detection is based may be blocked by the other valve. In such a case, the technologies disclosed in Patent Documents 2 and 3 decrease the accuracy of detection. In the first embodiment, however, the knock sensor 212 detects the seating sounds of both the intake valve and exhaust valve. The knock sensor can sense the seating sound of one valve no matter whether the other valve is open or closed. Consequently, the first embodiment will not possibly decrease the accuracy of detection, unlike the technologies disclosed in Patent Documents 2 and 3.

Second Embodiment

As described under "Details of Process Performed in First Embodiment," the routine shown in FIG. 25 is executed when a fuel cut operation starts and when the fuel cut operation ends. In a multicylinder internal combustion engine, the cylinders of the internal combustion engine experience an explosion stroke in a particular order. When the internal combustion engine has four cylinders, the explosion stroke occurs, for example, in the first cylinder, the fourth cylinder, the third cylinder, the second cylinder, and the first cylinder cyclically in the order named.

Due to such an explosion order of cylinders, a stoppable cylinder and an unstoppable cylinder are encountered. In a stoppable cylinder, the valves can be halted immediately at the beginning of a fuel cut because fuel injection is not completed. In an unstoppable cylinder, on the other hand, the valves cannot be halted until a combustion stroke is completed because fuel injection is already completed. In the above instance, a second embodiment of the present invention controls the ignition timing of the unstoppable cylinder (retards or inhibits an ignition) so that an ignition sound of the unstoppable cylinder does not coincide with the valve seating sound of the stoppable cylinder. This makes it possible to complete the combustion stroke for the unstoppable cylinder while immediately determining the presence of the valve seating sound of the stoppable cylinder. The amount of ignition timing retardation should preferably be determined so as to maximize the time interval between the ignition timing and the valve seating timing without causing a misfire or other combustion problem.

Further, when restoration is achieved from a fuel cut to fuel injection control, an early restoration cylinder and a later restoration cylinder are encountered. In an early restoration cylinder, valve operations are resumed early. In a later restoration cylinder, on the other hand, the valve operations are resumed later. The second embodiment inhibits an ignition while the status is switching from a valve operation state to a valve halt state and switching from the valve halt state to the valve operation state. This makes it possible to avoid the generation of an ignition-induced noise during a period during which the valve seating sound should be detected.

Figure 26:
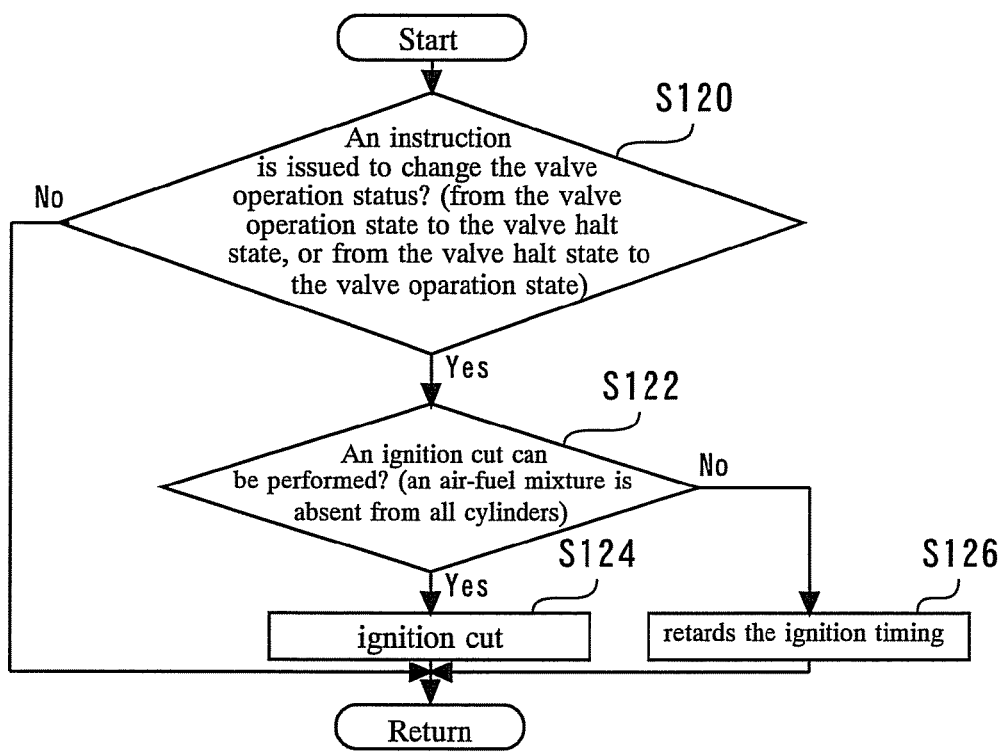
FIG. 26 is a flowchart illustrating a routine that ECU 220 executes in accordance with a second embodiment of the present invention.

The second embodiment is implemented when the ECU 220 included in the hardware configuration shown in FIG. 24 exercises control as indicated in a flowchart of FIG. 26. The flowchart shows a routine that is to be executed before the routine shown in FIG. 25. More specifically, the routine shown in FIG. 26 can be executed in parallel with valve halt control at the beginning of a fuel cut.

The routine shown in FIG. 26 first performs step S120 to judge whether an instruction is issued to change the valve operation status. More specifically, this step is performed to judge whether either valve halt control or valve restoration control is being exercised. Valve halt control is exercised to switch from the valve operation state to the valve halt state, whereas valve restoration control is exercised to switch from the valve halt state to the valve operation state. If neither valve halt control nor valve restoration control is being exercised, the routine terminates.

If, on the other hand, the condition of step S120 is established, the routine proceeds to step S122 and judges whether an ignition cut can be performed. Step S122 is performed to judge whether an air-fuel mixture is absent from all cylinders. When, for instance, a fuel cut operation begins, step S122 is performed to judge whether each cylinder is about to experience a fuel injection after termination of a preceding combustion stroke. This judgment may be made in accordance, for instance, with the crank angle and the injection history of the fuel injection valve, which have to be newly acquired. If the air-fuel mixture is absent from all cylinders, the routine concludes that an ignition cut can be performed.

If the judgment result obtained in step S122 indicates that an ignition cut can be performed, the routine proceeds to step S124 and inhibits the ignition plug 218 from igniting. Upon completion of step S124, the current routine terminates. Subsequently, the routine shown in FIG. 25 is executed. This makes it possible to avoid the generation of an ignition noise, determine the presence of the valve seating sound, and detect any abnormality in the valve drive mechanism 214 in accordance with the presence of the valve seating sound.

If, on the other hand, the judgment result obtained in step S122 does not indicate that an ignition cut can be performed, the routine proceeds to step S124 and retards the ignition timing. Upon completion of step S124, the current routine terminates. Subsequently, the routine shown in FIG. 25 is initiated.

Performing the above process makes it possible to prevent an ignition noise from coinciding with the valve seating sound, determine the presence of the valve seating sound, and detect any abnormality in the valve drive mechanism 214 in accordance with the presence of the valve seating sound. In addition, knocking can be surely prevented by retarding the ignition timing. Therefore, knocking will not possibly obstruct the detection of the valve seating sound. This enhances the accuracy of valve seating sound detection.

The second embodiment retards the ignition timing in step S126. Alternatively, however, the ignition timing may be advanced in step S126.

In the second embodiment, which has been described above, the "ignition control means" according to the second aspect of the present invention is implemented when the ECU 220 performs steps S122, S124, and S126 in the flowchart of FIG. 26. Further, in the second embodiment, the "output acquisition means" according to the second aspect of the present invention is implemented when the ECU 220 initiates the process shown in the flowchart of FIG. 25 after completion of the steps shown in the flowchart of FIG. 26, and then performs step S102 or S108.

Third Embodiment

In a multicylinder internal combustion engine, the seating timings of the intake valve and exhaust valve of a cylinder may coincide with (or become extremely close to) those of the intake valve and exhaust valve of another cylinder. When the presence of an in-cylinder valve seating sound is to be determined in such a situation, the seating sound of a valve of one cylinder becomes a noise for the seating sound of a valve of another cylinder. In view of such circumstances, a third embodiment of the present invention configures the valve drive mechanism 214 as a VVT mechanism (variable valve timing system). The third embodiment then prevents the valve seating timings from coinciding with each other by changing the valve opening characteristics of the valves.

Figure 27:
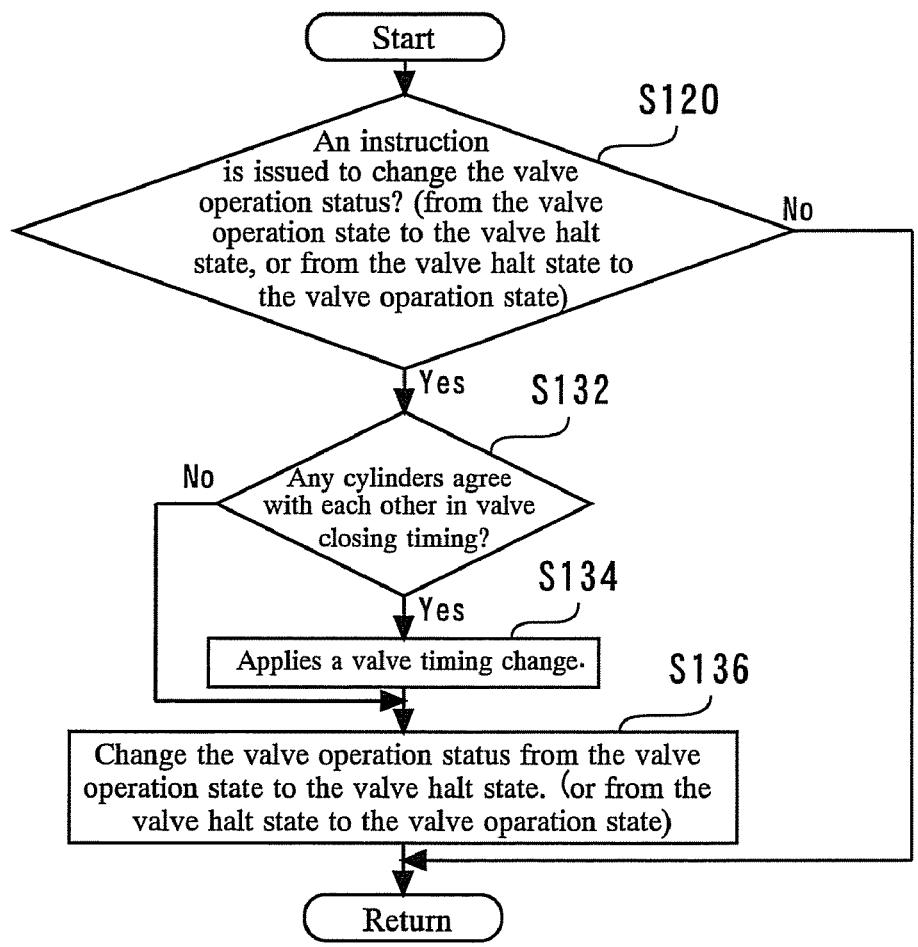
FIG. 27 is a flowchart illustrating a routine that ECU 220 executes in accordance with a third embodiment of the present invention.

The third embodiment is implemented when the ECU 220 included in the hardware configuration shown in FIG. 24 exercises control as indicated in a flowchart of FIG. 27. The flowchart shows a routine that is to be executed before valve halt control and is initiated at the beginning of a fuel cut operation.

The routine shown in FIG. 27 first performs step S120 to judge whether an instruction is issued to change the valve operation status. The process performed in this step is the same as the process performed in step S120 of the second embodiment. If the condition of this step is not established, the routine terminates.

If the condition of step S120 is established, the routine proceeds to step S132 and judges whether any cylinders agree with each other in valve closing timing. Step S132 is performed to compare the valve closing timings (the crank angles at which the valves close) of the intake valves and exhaust valves of a plurality of cylinders. In reality, however, the valve seating timings of pairs of neighboring intake and exhaust valves are predetermined in accordance with the explosion order of cylinders. Therefore, step S132 can be completed by comparing the valve closing timings of such neighboring valves.

If the judgment result obtained in step S132 indicates that two valves agree with each other in valve closing timing, the routine proceeds to step S134 and applies a valve timing change. Step S134 is performed so that the seating timings of the two valves having the same valve closing timing differ from each other by more than a predetermined amount. More specifically, a valve timing change is applied so that the seating timing of one valve differs from the seating timing of the other valve by a predetermined crank angle (CA) of $\alpha°$. The value $\alpha°$ may be predetermined during a design stage. Typically, it may range from approximately 10° CA to approximately 20° CA. Alternatively, a cam angle may be used as a reference.

Next, the routine proceeds to step S136 and changes the valve operation status. Step S136 is performed to exercise valve halt control at the beginning of a fuel cut operation or valve restoration control at the end of a fuel cut operation. Upon completion of step S136, the current routine terminates. Subsequently, the routine shown in FIG. 25 is initiated.

When the presence of the valve seating sound of one cylinder is to be determined, performing the above process makes it possible to prevent the valve seating sound of another cylinder from becoming a noise. As a result, the knock sensor 212 can properly distinguish between a plurality of valves when it senses a seating sound on which the judgment of seating sound presence is based.

In the third embodiment, which has been described above, the "variable valve train" according to the third aspect of the present invention is implemented when the valve drive mechanism 214 is configured as a VVT mechanism (not shown). Further, in the third embodiment, the "phase change means" according to the third aspect of the present invention is implemented when the ECU 220 performs steps S132 and S134 in the flowchart of FIG. 27. Moreover, in the third embodiment, the "output acquisition means" according to the third aspect of the present invention is implemented when the ECU 220 initiates the process shown in the flowchart of FIG. 25 after completion of the steps shown in the flowchart of FIG. 27, and then performs step S102 or S108.

Fourth Embodiment

A fourth embodiment of the present invention has the same hardware configuration as the first embodiment. The fourth embodiment is implemented when the ECU 220 included in the hardware configuration shown in FIG. 24 exercises control as indicated in a flowchart of FIG. 28. The fourth embodiment will now be described mainly with reference to the differences from the first embodiment.

As described in connection with the first embodiment, a change equivalent to the generation of a valve seating sound should appear in the output of the knock sensor 212 when the valve drive mechanism 214 functions normally in accordance with valve halt control or valve restoration control.

The intake valve and exhaust valve usually open and close in synchronism with crankshaft rotation. The internal combustion engine 208 is of a four-stroke type. Therefore, if each valve is not halted in a situation where the valve opening characteristics of each valve are not significantly changed, each valve emits its seating sound at a predetermined timing each time the crankshaft rotates through 720°. For example, it is anticipated that when the crankshaft rotates through 720° after the generation of the intake valve seating sound of a first cylinder, the intake valve seating sound of the first cylinder will be generated again.

In view of the above circumstances, the fourth embodiment compares, at each valve seating timing, the current knock sensor output value against a knock sensor output value generated earlier by a crank angle of 720°. If the difference between the two knock sensor output values is equivalent to the generation of a valve seating sound, the fourth embodiment concludes that the valve status has changed from the driven state to the halt state or from the halt state to the driven state.

Figure 28:
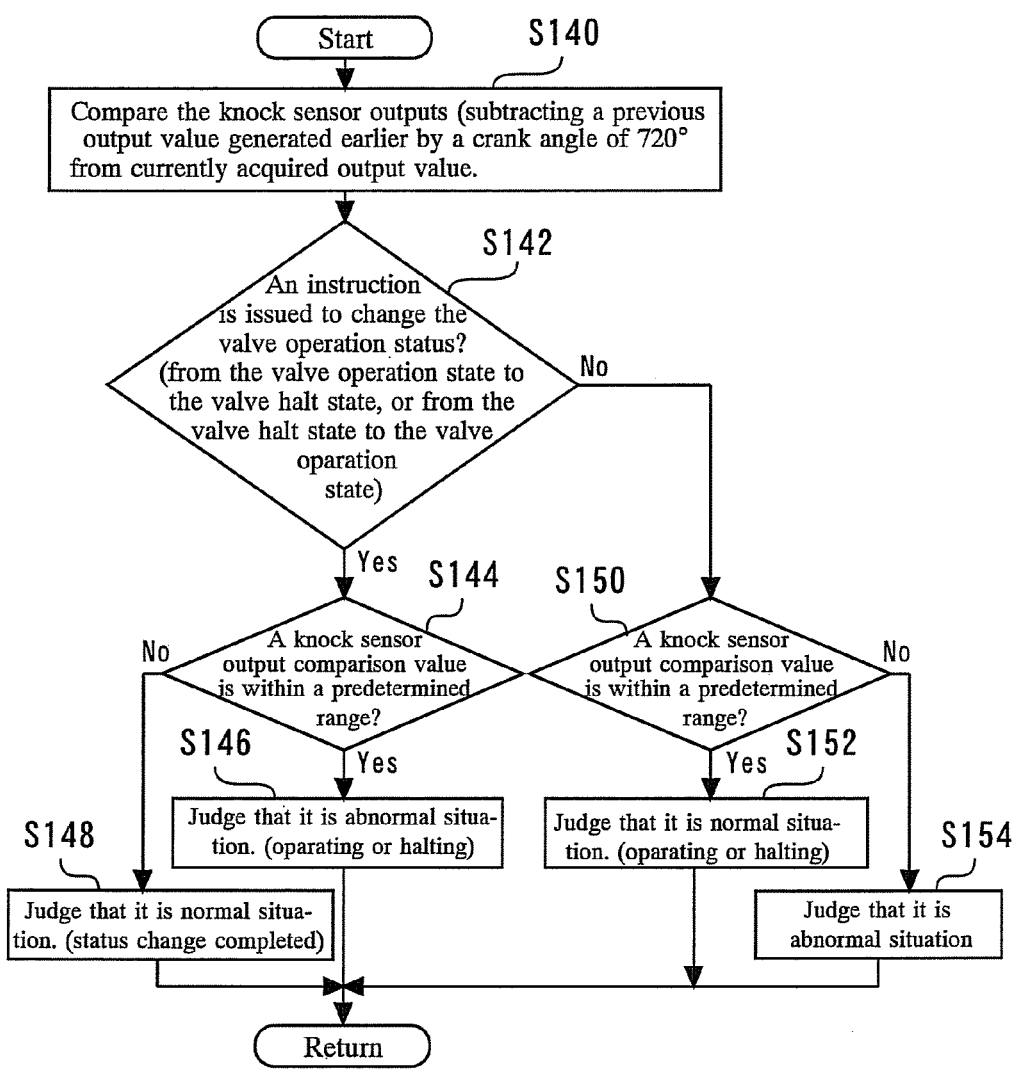
FIG. 28 is a flowchart illustrating a routine that ECU 220 executes in accordance with a fourth embodiment of the present invention.

FIG. 28 is a flowchart illustrating a routine that the ECU 220 executes in the fourth embodiment. The fourth embodiment assumes that the routine shown in FIG. 28 is repeatedly executed during an operation of the internal combustion engine 208, including at the beginning and end of a fuel cut operation.

The routine shown in FIG. 28 first performs step S140 to compare the knock sensor outputs. In step S140, the seating timings of the intake valve and exhaust valve are first calculated. Then, the ECU 220 acquires an output value of the knock sensor 212 that is generated at the seating timing of a valve targeted for seating sound presence determination. The valve targeted for seating sound presence determination may be predetermined during a design stage. Next, the routine performs a process for subtracting a previous output value of the knock sensor 212, which was generated earlier by a crank angle of 720°, from the currently acquired output value of the knock sensor 212. The value derived from the above subtraction may be hereinafter referred to as the value $\Delta K$. In the present embodiment, the value $\Delta K$ is the absolute value of the difference between the two knock sensor outputs. Further, in the present embodiment, the ECU 220 is supposed to store a knock sensor output generated several cycles earlier so that at least a knock sensor output generated earlier by a crank angle of 720° can be referenced.

Next, the routine performs step S142 to judge whether an instruction is issued to change the valve operation status. Step S142 is performed to judge whether either valve halt control or valve restoration control was exercised before the execution of the current routine. More specifically, a control history of the ECU 220 is referenced to judge whether either valve halt control or valve restoration control was exercised.

If the judgment result obtained in step S142 indicates that either valve halt control or valve restoration control was exercised, the routine proceeds to step S144. Step S144 is performed to judge whether the value $\Delta K$, which was calculated in step S140, is within a predetermined range. The present embodiment assumes that the value $\Delta K$ is an absolute value. Thus, step S144 is actually performed to judge whether the value $\Delta K$ is not greater than a predetermined value. If the value $\Delta K$ is unduly great and outside the predetermined range, the routine concludes that a valve seating sound is generated newly or lost. If, on the contrary, the value $\Delta K$ is small and within the predetermined range, the routine concludes that no valve seating sound is generated or lost. In other words, the routine concludes that the valve operation status is not changed. The above-mentioned predetermined range may be predefined through an experiment or the like.

If the judgment result obtained in step S144 indicates that a knock sensor output comparison value, that is, the value $\Delta K$, is within the predetermined range, the routine proceeds to step S146 and concludes that the valve drive mechanism 214 is abnormal. As mentioned earlier, when the routine proceeds to step S144 upon completion of step S142, it means that either valve halt control or valve restoration control was exercised. In such an instance, it is expected that the value $\Delta K$ would change to represent a knock sensor output value decrease due to the loss of a valve seating sound or a knock sensor output value increase due to the generation of a valve seating sound. As the value $\Delta K$ is within the predetermined range, contrary to such expectation, the routine concludes that the valve drive mechanism 214 is abnormal. Upon completion of step S146, the routine terminates.

If, on the other hand, the judgment result obtained in step S144 does not indicate that the knock sensor output comparison value, that is, the value $\Delta K$, is within the predetermined range, the routine proceeds to step S148 and concludes that the valve drive mechanism 214 is normal. The reason is that the knock sensor output is changed to imply the generation of a valve seating sound as the value $\Delta K$ is great and outside the predetermined range, contrary to step S146. Upon completion of step S148, the routine terminates.

If the judgment result obtained in step S142 indicates that neither valve halt control nor valve restoration control was exercised, the routine proceeds to step S150. In step S150, the same process is performed as in step S144 described above to judge whether the value $\Delta K$ is within the predetermined range.

If the judgment result obtained in step S150 indicates that the value $\Delta K$ is within the predetermined range, the routine proceeds to step S152 and concludes that the valve drive mechanism 214 is normal. If, on the other hand, the judgment result does not indicate that the value $\Delta K$ is within the predetermined range, the routine proceeds to step S154 and concludes that the valve drive mechanism 214 is abnormal. These judgments are the contrary of those made in steps S146 and S148. More specifically, if no instruction is issued to change the valve operation status, the value $\Delta K$ should be small and within the predetermined range. Therefore, if the value $\Delta K$ is found to be within the predetermined range upon completion of steps S142 to S150, it can be concluded that the valve drive-mechanism 214 is normal. Further, if no instruction is issued to change the valve operation status, the value $\Delta K$ should be small and within the predetermined range. Therefore, if the value $\Delta K$ is found to be outside the predetermined range upon completion of steps S142 to S150, it can be concluded that the valve drive mechanism 214 is abnormal. Upon completion of step S154, the routine terminates.

Performing the above process makes it possible to determine the presence of the valve seating sound with high accuracy by making use of valve operation periodicity based on the crank angle.

In addition, the present embodiment compares two knock sensor outputs that differ from each other by a crank angle of 720°. This makes it possible to identify an output change that corresponds to the generation or loss of a valve seating sound. Therefore, the present embodiment is at an advantage in that the judgment of the valve seating sound is not significantly affected by noise. Further, noise generation, knocking, and the like do not occur periodically. However, the timing of valve seating sound generation exhibits sufficiently high periodicity because valve opening/closing operations synchronize with crankshaft rotation with high accuracy.

In the fourth embodiment, which has been described above, the "periodic output acquisition means" according to the fifth aspect of the present invention is implemented when the ECU 220 performs step S140 in the flowchart of FIG. 28; and the "comparative detection means" according to the fifth aspect of the present invention is implemented when the ECU 220 performs step S144 or S150 in the flowchart of FIG. 28.

[Modifications of Fourth Embodiment]

In step S140, which has been described above, the fourth embodiment compares two knock sensor outputs concerning the seating timing of a predetermined judgment target valve. However, the present invention is not limited to such a comparison. An alternative is to compare two knock sensor outputs concerning all valves or a plurality of selected valves.

The fourth embodiment assumes that the value $\Delta K$ is an absolute value. However, the present invention is not limited to such assumption. The value $\Delta K$ is obtained by subtracting a previous output value of the knock sensor 212, which was generated earlier by a crank angle of 720°, from a current output value of the knock sensor 212. Therefore, if the value $\Delta K$ is a positive value, the current knock sensor output value is greater than the previous knock sensor output value which was generated earlier by a crank angle of 720°. In this instance, it can be concluded that a new valve seating sound is generated due to an increase in the knock sensor output value, namely, the valve status has changed from the halt state to the driven state. If, on the contrary, the value $\Delta K$ is a negative value, it can be similarly concluded that the valve status has changed from the driven state to the halt state. As described above, more detailed abnormality judgments can be made in accordance with the polarity (positive or negative) of the value ΔK.

The fourth embodiment assumes that the internal combustion engine is of a four-stroke type. Therefore, the fourth embodiment compares two knock sensor outputs that differ from each other by a crank angle of 720°. However, the present invention is not limited to the comparison of such knock sensor outputs. More specifically, even if the internal combustion engine is of a two-stroke type or a six-stroke type, the presence of the valve seating sound can be determined, as is the case with the fourth embodiment, by comparing two knock sensor outputs that differ from each other by a crank angle equivalent to one combustion cycle. Not only a knock sensor output generated earlier by a crank angle of 720°, but also a knock sensor output generated earlier by a crank angle of 720°×n (where n is an integer equal to or greater than 1), such as 1440°, can be used as a comparison value. In other words, a plurality of knock sensor outputs that differ from each other by a crank angle equivalent to an integer multiple of one cycle may alternatively be compared. This makes it possible to detect the generation or loss of a valve seating sound in accordance with a control instruction for the valve drive mechanism 214.

Fifth Embodiment

The first to fourth embodiments, which have been described above, use the output of the knock sensor 212 to determine the presence of the seating sounds of the intake valve and exhaust valve. In a fifth embodiment of the present invention, the ECU 220 can execute a learning routine to learn a threshold value for the judgment of a valve seating sound. The fifth embodiment has the same hardware configuration as the third embodiment. More specifically, the fifth embodiment is configured so that the valve drive mechanism 214 for the internal combustion engine 208 according to the first embodiment functions as a VVT mechanism.

Figure 29:
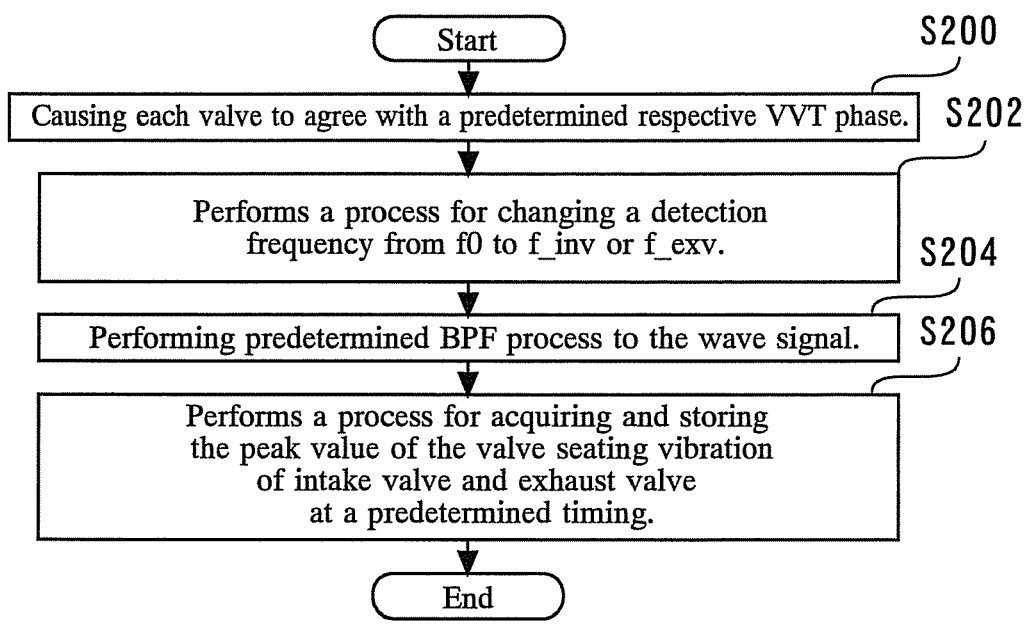
FIG. 29 is a flowchart illustrating a routine that ECU 220 executes in accordance with a fifth embodiment of the present invention.

FIG. 29 is a flowchart illustrating a learning routine that the ECU 220 executes in the fifth embodiment. The learning routine is executed while valves are being driven by the valve drive mechanism 214 during a fuel cut operation for the internal combustion engine 208. In reality, however, the present embodiment assumes that the ECU 220 sequentially starts a fuel cut operation for the internal combustion engine 208, executes the learning routine, exercises valve halt control, and executes the abnormality detection routines according to the first to fourth embodiments. In other words, valve halt control will not be initiated until a learning process is completed by the learning routine.

The routine shown in FIG. 29 first performs step S200 so that the valve opening characteristics of each valve agree with a predetermined respective VVT phase. If the closing timings of a plurality of valves coincide with each other, the plurality of valves generate a valve seating sound at the same time as described in connection with the third embodiment. As such being the case, the fifth embodiment performs step S200 so that the generations of valve seating sounds do not coincide with each other.

Figure 30:
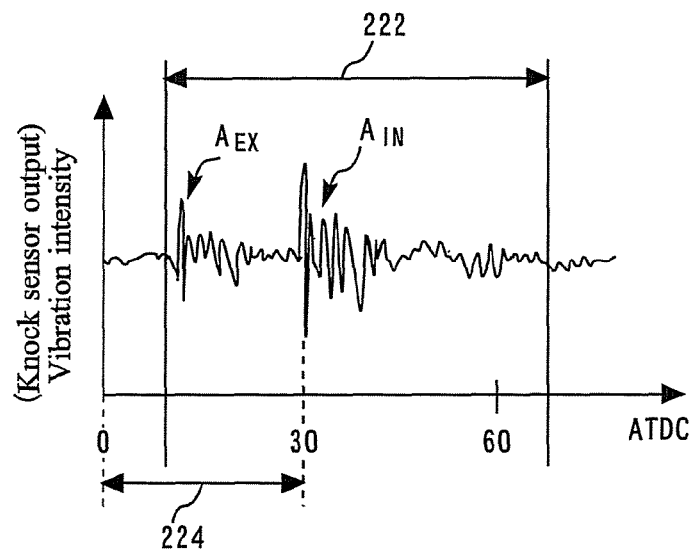
FIG. 30 is a diagram illustrating the coincidence of valve seating sound generation.

FIG. 30 is a diagram illustrating the coincidence of valve seating sound generation. In FIG. 30, $A_{EX}$ represents the variation of an exhaust valve seating sound, whereas $A_{IN}$ represents the variation of an intake valve seating sound. FIG. 30 indicates that the seating sounds of the intake valve and exhaust valve, the closing timings of which are close to each other, are revealed by the output of the knock sensor 212. In FIG. 30, arrow 224 indicates the closing timing range of the exhaust valve, which emits seating sound $A_{EX}$, whereas arrow 228 indicates the closing timing range of the intake valve, which emits seating sound $A_{IN}$. If the phase of a valve is changed in an offhand manner in a situation where the closing timing ranges of the valves overlap with each other as shown in FIG. 30, the coincidence of valve seating sound generations may not be completely avoided. In view of such circumstances, the fifth embodiment predetermines the phases to be set in step S200 so that the closing timings of the valves sufficiently differ from each other. In the present embodiment, the difference α° between the crank angle at which the intake valve becomes seated and the crank angle at which the exhaust valve becomes seated is within the range from approximately 10° CA to approximately 20° CA.

Next, the routine proceeds to step S202 and performs a process for changing a detection frequency from $f_0$ to $f_{\_inv}$ or $f_{\_exv}$. The "detection frequency" is a reference frequency for the passband of a bandpass filter in the external control circuit 216. The passband of the bandpass filter is equal to a frequency range that is defined by the detection frequency plus or minus a predetermined value. The value $f_0$ denotes the frequency of a vibration that the knock sensor 212 should sense during a period of knocking in the internal combustion engine 208. The value $f_{\_inv}$ denotes the frequency of an intake valve seating sound, whereas the value $f_{\_exv}$ denotes the frequency of an intake valve seating sound.

Figure 31:
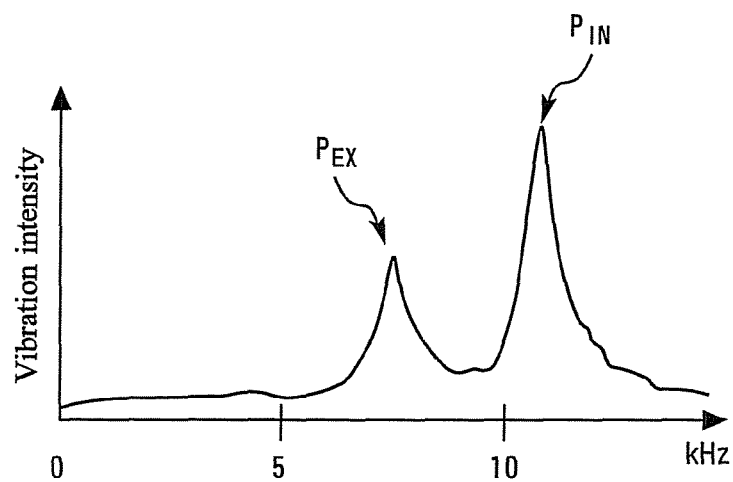
FIG. 31 shows the frequency characteristics of intake valve and exhaust valve seating sounds.

FIG. 31 shows the frequency characteristics of intake valve and exhaust valve seating sounds. FIG. 31 shows the result of a fast Fourier transform (FFM) that is performed on a knock sensor output waveform shown in FIG. 30. In FIG. 31, arrow $P_{EX}$ indicates the peak of an exhaust valve seating sound, whereas arrow $P_{IN}$ indicates the peak of an intake valve seating sound. As shown in FIG. 31, peaks $P_{EX}$ and $P_{IN}$ correspond to frequencies $f_{\_inv}$ and $f_{\_exv}$, respectively. The present embodiment assumes that the frequency characteristics shown in FIG. 31 are predetermined through an experiment or the like to predefine frequencies $f_{\_inv}$ and $f_{\_exv}$.

In step S204 of the routine shown in FIG. 29, the detection frequency of the bandpass filter in the external control circuit 216 is changed to $f_{\_inv}$ or $f_{\_exv}$. The output of the knock sensor 212 is then filtered by the bandpass filter.

Next, the routine proceeds to step S206 and performs a process for acquiring and storing the peak value of the filtered knock sensor output at a predetermined timing. As each valve is fixed to a predetermined phase in step S200, the crank angle at which the valve seating sound is superposed over the knock sensor output is determined. Therefore, the peak of the knock sensor output should be acquired from a crank angle range that is defined by the above-determined crank angle plus or minus a predetermined crank angle (approximately 10° CA in the fifth embodiment). The peak value stored in this manner is used as a seating sound threshold value for the intake valve or exhaust valve. If $f_{\_inv}$ was selected in step S204, step S206 is performed to store the peak value as an intake valve threshold value. If, on the other hand, $f_{\_exv}$ was selected in step S204, step S206 is performed to store the peak value as an exhaust valve threshold value. Upon completion of step S206, the routine terminates.

Performing the above process makes it possible to learn a threshold value for valve seating sound judgment. The threshold value learned by the learning routine is used as the threshold value in step S102 of the routine shown in FIG. 24, which depicts the first embodiment.

In the fifth embodiment, which has been described above, the "learning means" according to the eighth aspect of the present invention is implemented when the ECU 220 performs step S206 in the flowchart of FIG. 29.

[Modification of Fifth Embodiment]

A preferred modification of the fifth embodiment will now be described. The loudness of the valve seating sound (the intensity of collision) varies from one valve to another due, for instance, to the individual variability and mounting position of the valves in the cylinder block 210. Strictly speaking, the intake valve and exhaust valve both vary in diameter from one unit to another. Further, as the internal combustion engine 208 has four cylinders, the distance between the mounting position of the knock sensor 212 and the valves of the individual cylinders varies. In addition, a vibration transmission system between the knock sensor 212 and the individual valves varies depending on the structure of the cylinder block 210 and various accessories attached to the cylinder block 210.

In view of the above circumstances, the present modification executes the learning routine according to the fifth embodiment for each valve. More specifically, one learning process is performed for each of the intake valves and exhaust valves for the first to fourth cylinders so that a total of eight learning processes are performed. The ECU 220 then stores the individual learned values and the correspondence between the stored learned values and the valves. When the presence of the valve seating sound is to be determined, the learned value for the current judgment target valve is read at first. The read learned value is then set as a threshold value to determine the presence of the valve seating sound. The correspondence between the learned values and the valves and the identification of a judgment target valve for reading a learned value can be based on the crank angle or cam angle. In this manner, the individual learned values are set as threshold values to determine the presence of the valve seating sound of each valve. As this modification provides a learned value for each valve, it is possible to make highly accurate judgments in which the seating sound differences between the valves are reflected.

Sixth Embodiment

In a sixth embodiment of the present invention, the ECU 220 includes a frequency learning routine, which learns frequencies $f_{\_inv}$ and $f_{\_exv}$ in the fifth embodiment. The ECU 220 also includes an FFT computation section that performs a fast Fourier transform (FFT) on the output value of the knock sensor 212.

As shown in FIG. 31, the intake valve and exhaust valve differ in the frequency characteristics of the valve seating sound. It is anticipated that the intake valve and exhaust valve both vary in the frequency characteristics from one unit to another due, for instance, to aging. In view of such circumstances, the sixth embodiment learns frequencies $f_{\_inv}$ and $f_{\_exv}$ as well.

The sixth embodiment first performs an FFT computation on the output waveform of the knock sensor 212 within a predetermined crank angle range. The sixth embodiment assumes that the predetermined crank angle range is from $-60°$ CA to $90°$ CA. Alternatively, the predetermined crank angle range may be from $0°$ CA to $60°$ CA. Thus, an FFT computation can be performed on a knock sensor output waveform that includes $A_{EX}$ and $A_{IN}$ as shown in FIG. 30.

As a result of the FFT computation, the frequency characteristics shown in FIG. 31 are obtained. The sixth embodiment stores a frequency corresponding to peak value $P_{EX}$ as new frequency value $f_{\_exv}$, and stores a frequency corresponding to peak value $P_{IN}$ as new frequency value $f_{\_inv}$. When the routine shown in FIG. 29 is to be executed later, latest frequencies $f_{\_exv}$ and $f_{\_inv}$ can be used in step S202.

Hardware Configuration of Valve Drive Mechanism 214

The contents of Japanese Patent Application No. 2008-122616 will be set forth below to describe in detail the configuration of the valve drive mechanism 214 according to an embodiment of the present invention with reference to FIGS. 1 to 23. The following description relates to the configuration of an intake valve section. However, when an exhaust valve section is configured the same as the intake valve section, the exhaust valve section can also be switched between the driven state and the halt state. Thus, the description of the configuration of the exhaust valve section is omitted here to avoid redundancy.

FIG. 1 is a schematic diagram illustrating the configuration of an internal combustion engine described in Japanese Patent Application No. 2008-122616.

The internal combustion engine 1 shown in FIG. 1 is a four-stroke-cycle spark-ignition internal combustion engine (gasoline engine). This internal combustion engine 1 includes four cylinders 21, 22, 23, 24. The four cylinders 21, 22, 23, 24 each include two intake valves 3 and two exhaust valves 4. Further, the four cylinders 21, 22, 23, 24 each include an ignition plug 5, which generates a spark in a cylinder.

Figure 2:
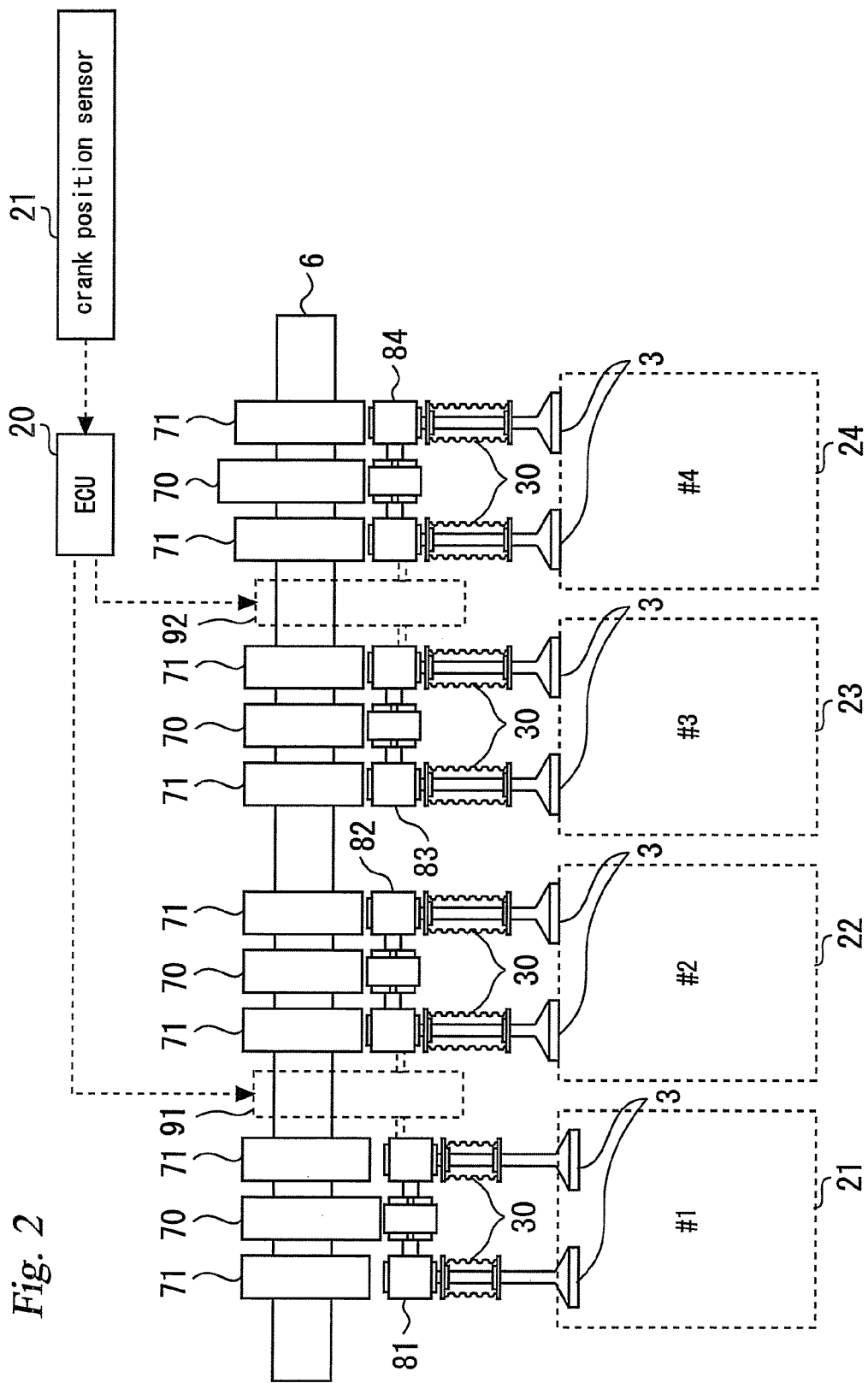
FIG. 2 is a schematic diagram illustrating a configuration of a mechanism that opens and closes an intake valve.

As shown in FIG. 2, each intake valve 3 opens and closes by using the actuating force of cams 70, 71 mounted on an intake camshaft 6 and the pressing force of a valve spring 30. The intake camshaft 6 is coupled to an engine output shaft (crankshaft), which is not shown, via a timing chain or a timing belt, and rotated at half the speed of the crankshaft.

Main cams 70 and sub-cams 71 are mounted on the intake camshaft 6. Each cylinder is provided with one main cam 70 and two sub-cams 71. Each main cam 70 is positioned between two sub-cams 71. The cam profile of a main cam 70 is formed so that the main cam 70 provides a larger operating angle and lift amount (the height of a cam nose) than a sub-cam 71.

In the present embodiment, the cam profile of the sub-cam 71 is formed so that the lift amount of the intake valve 3 is zero (the height of the cam nose is zero). In other words, the sub-cam 71 is a zero-lift cam, which has a base circle only.

Adjustment mechanisms 81, 82, 83, 84 are positioned between the cams 70, 71 and intake valves 3 of the cylinders 21, 22, 23, 24. In other words, the actuating force of the cams 70, 71 is transmitted to the two intake valves 3 through the adjustment mechanisms 81, 82, 83, 84.

The adjustment mechanisms 81, 82, 83, 84 change the valve opening characteristics of the intake valves 3 by switching between a state where the actuating force of the main cam 70 is transmitted to the intake valves 3 and a state where the actuating force of the sub-cams 71 is transmitted to the intake valves 3.

As the sub-cams 71 in the present embodiment are zero-lift cams, the state where the actuating force of the sub-cams 71 is transmitted to the intake valves 3 is a state where the intake valves 3 do not open or close (valve halt state).

The adjustment mechanism 81 for the first cylinder (#1) 21 (hereinafter referred to as the "first adjustment mechanism") and the adjustment mechanism 82 for the second cylinder (#2) 22 (hereinafter referred to as the "second adjustment mechanism") are driven by one actuator 91 (hereinafter referred to as the "first actuator"). The subsequent description assumes that the first adjustment mechanism 81, the second adjustment mechanism 82, and the first actuator 91 form a first adjustment group.

Similarly, the adjustment mechanism 83 for the third cylinder (#3) 23 (hereinafter referred to as the "third adjustment mechanism") and the adjustment mechanism 84 for the fourth cylinder (#4) 24 (hereinafter referred to as the "fourth adjustment mechanism") are driven by one actuator 92 (hereinafter referred to as the "second actuator"). The subsequent description assumes that the third adjustment mechanism 83, the fourth adjustment mechanism 84, and the second actuator 92 form a second adjustment group.

The configurations of the first and second adjustment groups will now be described. As the first and second adjustment groups are similar in configuration, the configuration of the first adjustment group is described below.

Figure 3:
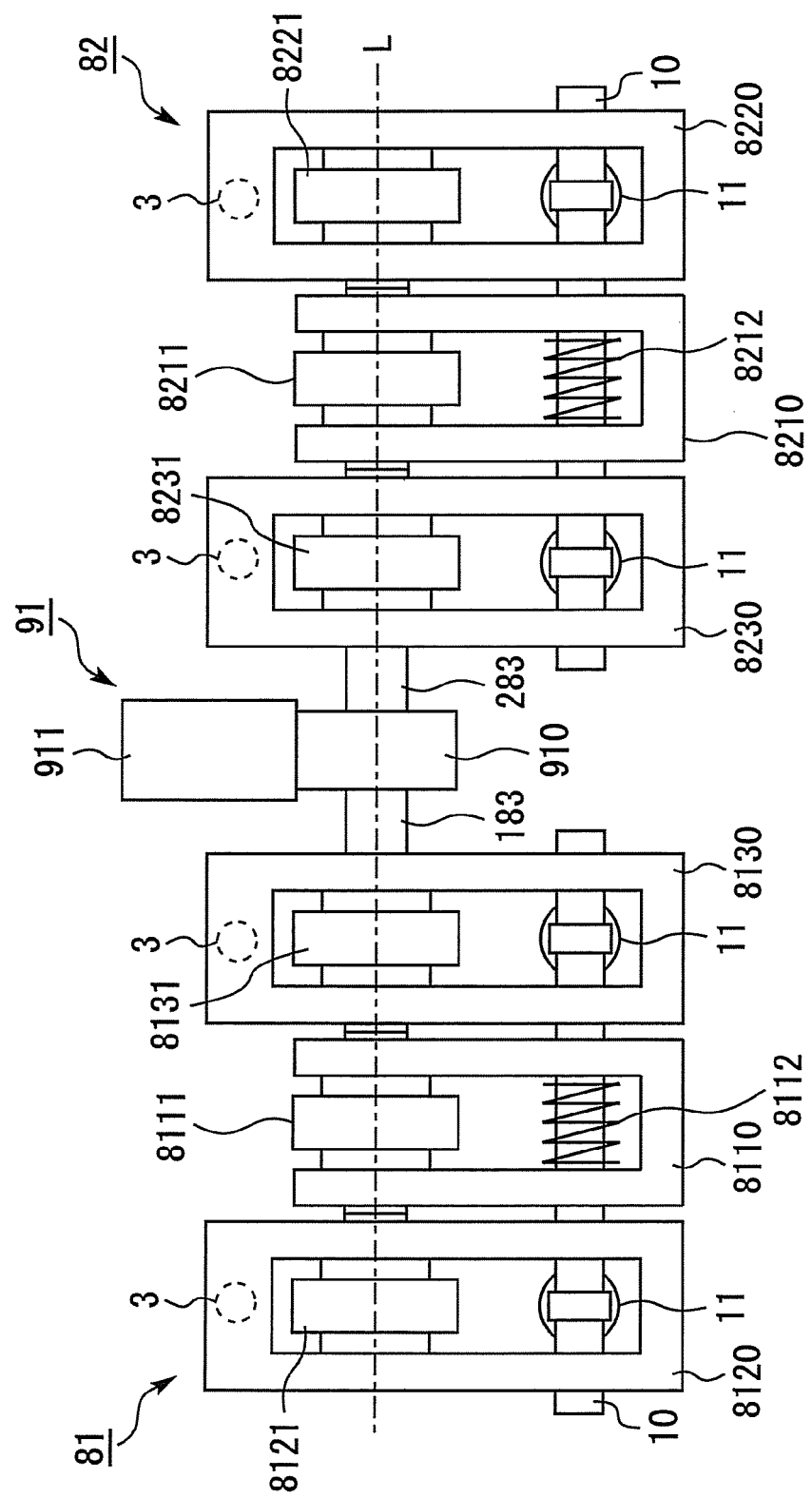
FIG. 3 is a plan view of a first adjustment group.
Figure 4:
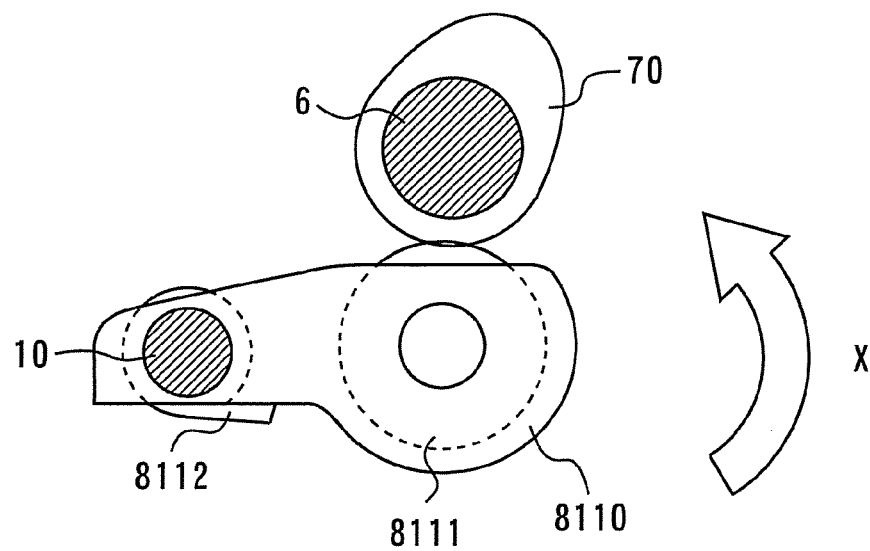
FIG. 4 is a side view of a first roller rocker arm.

FIG. 3 is a plan view of the first adjustment group. Referring to FIG. 3, the first adjustment mechanism 81 includes a rocker shaft 10, which is positioned in parallel with the intake camshaft 6. The rocker shaft 10 is supported by the cylinder head of the internal combustion engine 1 via a lash adjuster 11.

One first roller rocker arm 8110 and a pair of second roller rocker arms 8120, 8130 are rotatably mounted on the rocker shaft 10. The first roller rocker arm 8110 is positioned between the two second roller rocker arms 8120, 8130. In the present embodiment, the first roller rocker arm 8110 is shorter than the second roller rocker arms 8120, 8130.

A first roller 8111 is rotatably supported by the leading end of the first roller rocker arm 8110. The first roller rocker arm 8110 is pressed in the direction indicated by arrow X in FIG. 4 by a coil spring 8112 mounted on the rocker shaft 10. In other words, the coil spring 8112 presses the first roller rocker arm 8110 so that the first roller 8111 constantly abuts on the aforementioned main cam 70.

The first roller rocker arm 8110, which is configured as described above, swings around the rocker shaft 10 by the action of the actuating force of the main cam 70 and the pressing force of the coil spring 8112. The first roller rocker arm 8110 corresponds to the first swing member described in Japanese Patent Application No. 2008-122616.

Figure 5:
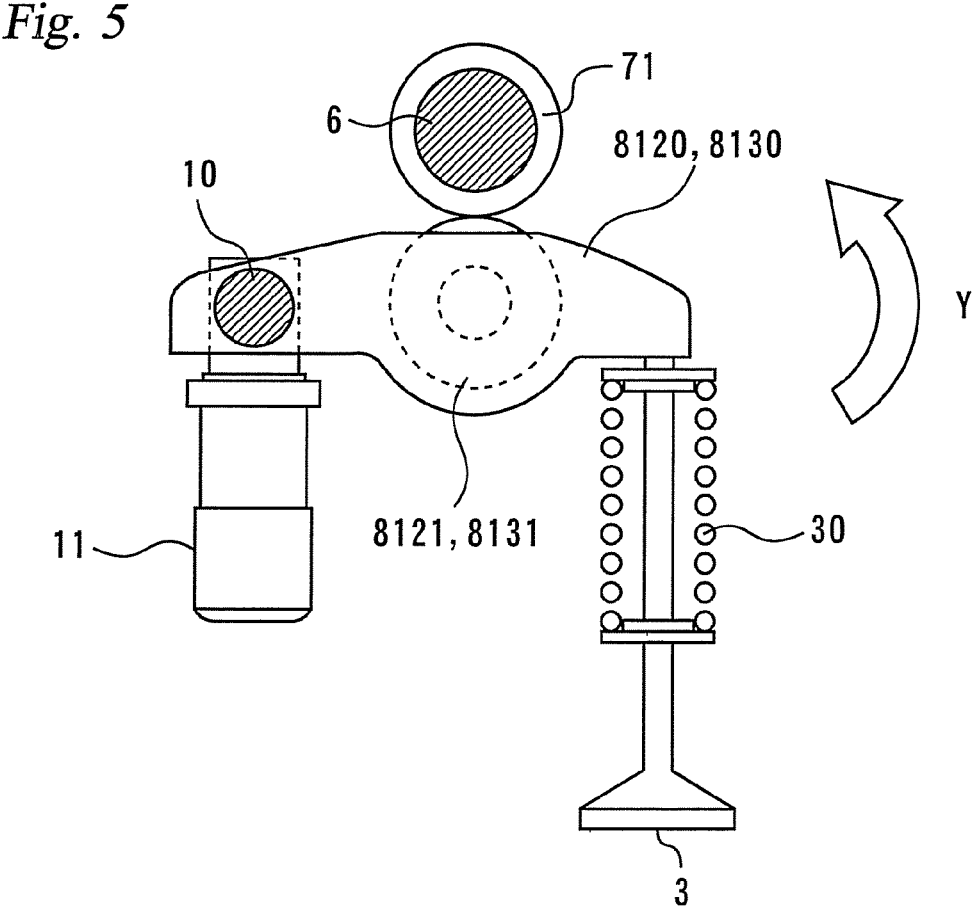
FIG. 5 is a side view of a second roller rocker arm.

Meanwhile, the base end section of an intake valve 3, or more specifically, the base end section of a valve stem, abuts on the leading ends of the second roller rocker arms 8120, 8130 as shown in FIG. 5. Second rollers 8121, 8131 are rotatably supported by the second roller rocker arms 8120, 8130, and positioned toward the rocker shaft 10 and away from the abutment portion of the intake valve 3. The second rollers 8121, 8131 have the same outside diameter as the aforementioned first roller 8111.

The second rollers 8121, 8131 are positioned so that the axial center of the second rollers 8121, 8131 aligns with the axial center of the first roller 8111 (see the straight line L in FIG. 3) when the first roller 8111 abuts on the base circle of the main cam 70 (see FIG. 4) and the second rollers 8121, 8131 abut on the base circle of the sub-cam 71 (see FIG. 5).

The second roller rocker arms 8120, 8130 are pressed in the direction indicated by arrow Y in FIG. 5 by the valve spring 30. Therefore, the second rollers 8121, 8131 are pressed against the sub-cam 71 by the valve spring 30 when the sub-cam 71 lifts the intake valve 3. However, this does not hold true for the sub-cam 71 in the present embodiment as it is a zero-lift cam.

The second roller rocker arms 8120, 8130 are pressed against the sub-cam 71 by the lash adjuster 11 while the intake valve 3 is not lifted by the sub-cam 71.

The second roller rocker arms 8120, 8130 configured as described above correspond to the second swing member described in Japanese Patent Application No. 2008-122616.

A mechanism for coupling the first roller rocker arm 8110 to the second roller rocker arms 8120, 8130 and uncoupling the first roller rocker arm 8110 from the second roller rocker arms 8120, 8130 (hereinafter referred to as the "first switching mechanism") will now be described.

Figure 6:
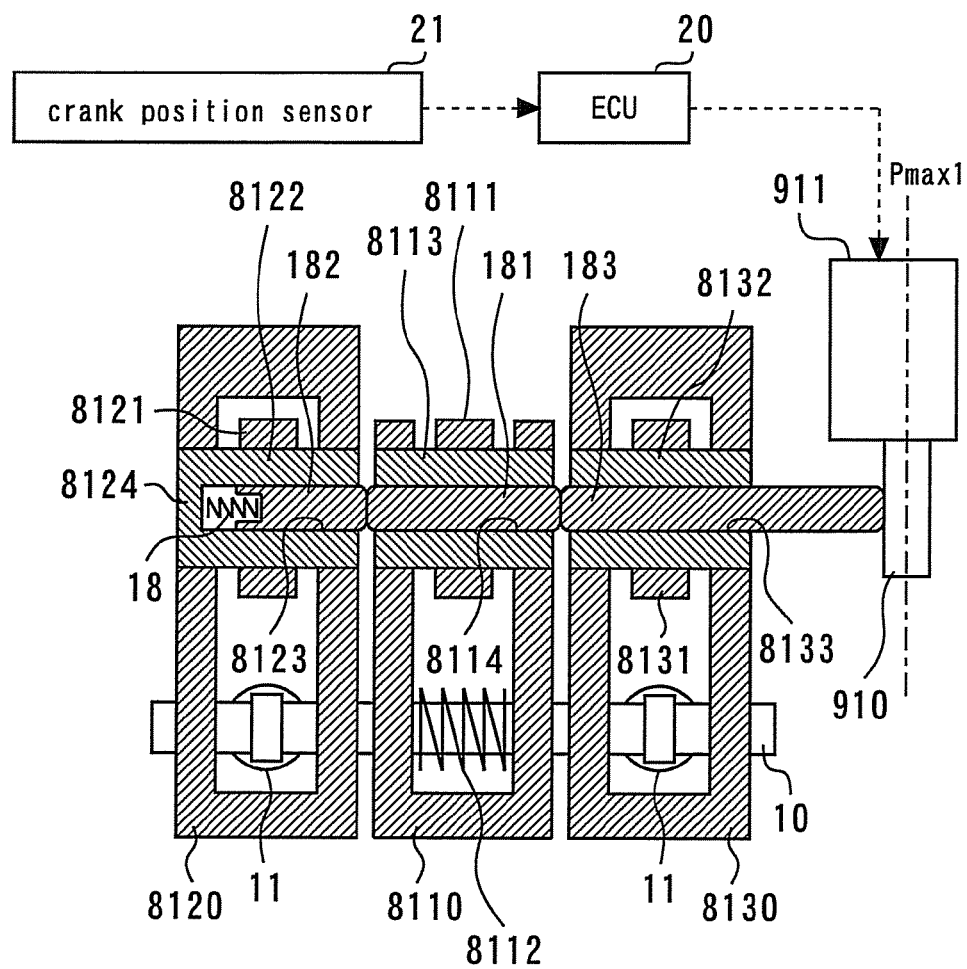
FIG. 6 is a horizontal cross-sectional view of a first adjustment mechanism.

FIG. 6 is a horizontal cross-sectional view of the first adjustment mechanism 81. It is assumed that the second adjustment mechanism 82 is positioned on the right-hand side of FIG. 6.

Referring to FIG. 6, a first pinhole 8114, which is axially extended, is formed in a spindle 8113 for the first roller 8111 (this spindle is hereinafter referred to as the "first spindle"). Both ends of the first pinhole 8114 are open toward both lateral surfaces of the first roller rocker arm 8110.

Figure 7:
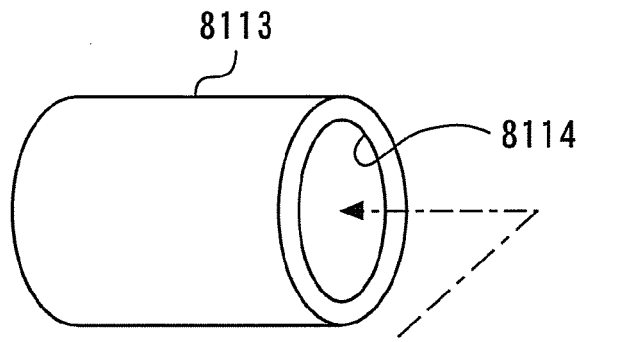
FIG. 7 is a diagram illustrating a first spindle and a first pin.

A first pin 181, which is cylindrical in shape, is slidably inserted into the first pinhole 8114 as shown in FIG. 7. The outside diameter of the first pin 181 is substantially equal to the inside diameter of the first pinhole 8114. The first pin 181 has substantially the same axial length as the first pinhole 8114.

Returning to FIG. 6, second pinholes 8123, 8133, which are axially extended, are formed in spindles 8122, 8132 for the second rollers 8121, 8131 (these spindles are hereinafter referred to as the "second spindles"). The second pinholes 8123, 8133 have the same inside diameter as the first pinhole 8114.

The second pinhole 8123 (the second pinhole positioned opposite the second adjustment mechanism 82 relative to the first roller rocker arm 8110), which is one of the two second pinholes 8123, 8133, is formed so that its end positioned toward the first roller rocker arm 8110 is open while the other end 8124, positioned opposite the first roller rocker arm 8110, is closed (this closed end is hereinafter referred to as the "closed end").

Figure 8:
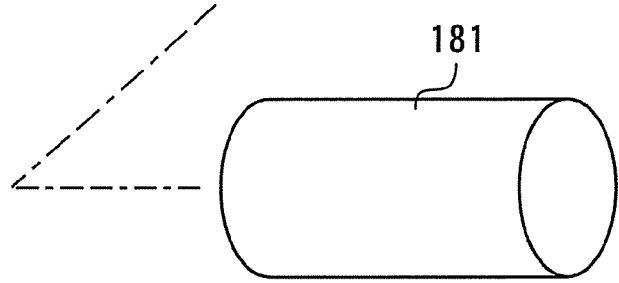
FIG. 8 is a diagram illustrating a second spindle and a second pin.
Figure 8:
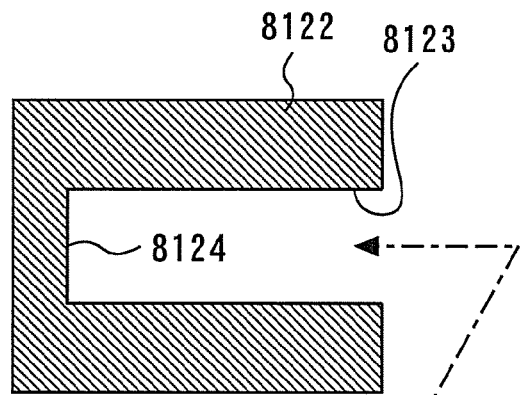
Figure 8:
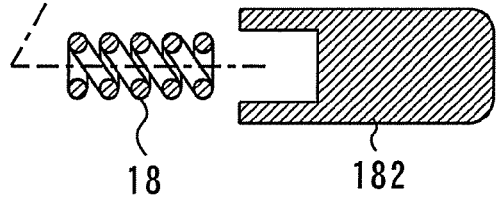

A second pin 182, which is cylindrical in shape, is slidably inserted into the second pinhole 8123 as shown in FIG. 8. The outside diameter of the second pin 182 is substantially equal to the inside diameter of the second pinhole 8123. The second pin 182 is axially shorter than the second pinhole 8123.

In the second pinhole 8123, a return spring 18 is positioned between the base end of the second pin 182 (this end is positioned toward the closed end 8124) and the closed end 8124. The return spring 18 is a member that presses the second pin 182 toward the first roller rocker arm 8110.

Returning to FIG. 6, both ends of the remaining second pinhole 8133 (the second pinhole positioned toward the second adjustment mechanism 82 relative to the first roller rocker arm 8110), which is one of the two second pinholes 8123, 8133, are open toward both lateral surfaces of the second roller rocker arm 8130, as is the case with the first pinhole 8114.

A second pin 183, which is cylindrical in shape, is slidably inserted into the second pinhole 8133. The outside diameter of the second pin 183 is equal to the inside diameter of the second pinhole 8133. The second pin 183 is axially longer than the second pinhole 8133.

The axial centers of the pinholes 8114, 8123, 8133 need not coincide with those of the spindles 8113, 8122, 8132. However, it is assumed that the relative positions of the three pinholes 8114, 8123, 8133 meet the conditions described below.

More specifically, the relative positions of the three pinholes 8114, 8123, 8133 are determined so that the axial centers of the three pinholes 8114, 8123, 8133 are in alignment when the first roller 8111 abuts on the base circle of the main cam 70 (see FIG. 4) and the second rollers 8121, 8131 abut on the base circle of the sub-cam 71 (see FIG. 5).

In the first switching mechanism configured as described above, the second pin 182 is constantly pressed toward the first roller rocker arm 8110 by the return spring 18. Therefore, the leading end of the second pin 182 is pressed against the base end of the first pin 181. Accordingly, the leading end of the first pin 181 is pressed against the base end of the second pin 183. As a result, the leading end of the second pin 183 constantly abuts on a displacement member 910 of the first actuator 91.

The displacement member 910 can freely move forward and backward in the axial directions of the spindles 8113, 8122, 8132 (namely, in the axial directions of the pins 181, 182, 183), and is displacement driven by a drive section 911.

The drive section 911 operates on hydraulic pressure and electrical power and displaces the displacement member 910. The drive section 911 is electrically controlled by an ECU 100. The ECU 100 is an electronic control unit for controlling the operating status of the internal combustion engine 1. The ECU 100 controls the drive section 911 in accordance with the output signal of a crank position sensor 101 or the like. The crank position sensor 101 detects the rotation angle of an output shaft (crankshaft) of the internal combustion engine 1.

It is assumed that the relative arrangement and dimensions of the displacement member 910, the return spring 18, the first pin 181, and the second pins 182, 183 are determined to meet the following two conditions.

(1) When the displacement member 910 is positioned at a displacement end Pmax1 toward the second adjustment mechanism 82, namely, the return spring 18 is stretched to its predefined maximum length, the leading end of the second pin 182 and the base end of the first pin 181 are positioned in the gap between the second roller rocker arm 8120 and the first roller rocker arm 8110 and the leading end of the first pin 181 and the base end of the second pin 183 are positioned in the gap between the first roller rocker arm 8110 and the second roller rocker arm 8130 (see FIG. 6).

Figure 9:
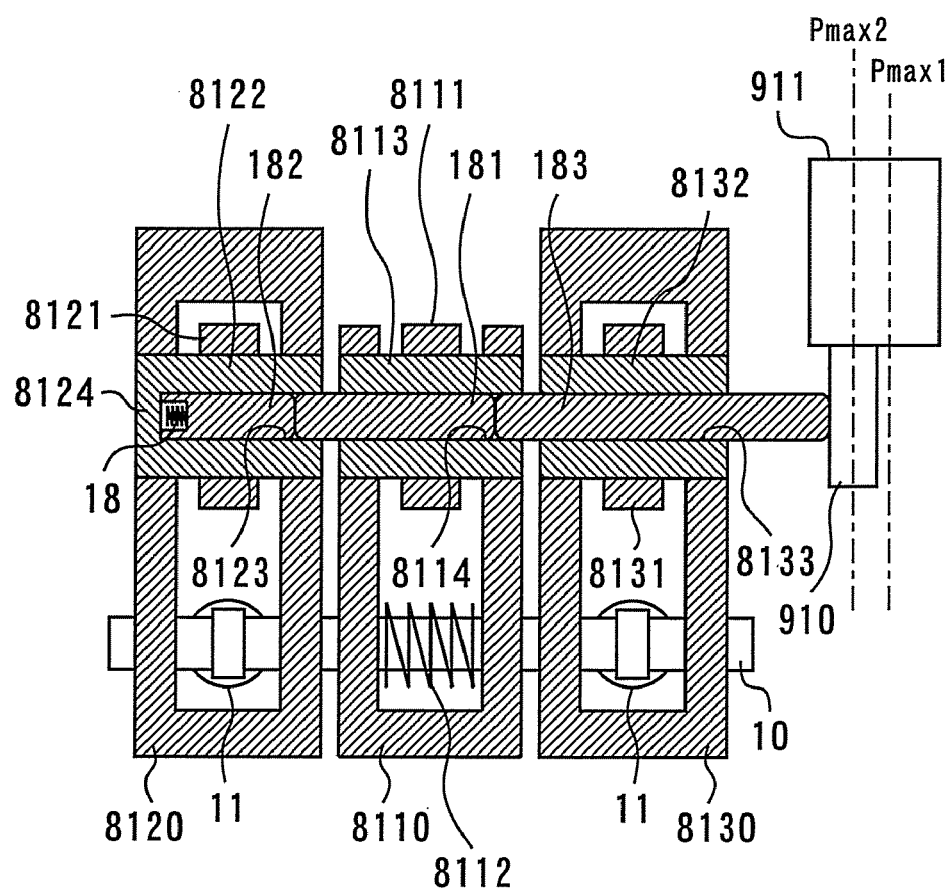
FIG. 9 is a diagram illustrating movement of a first switching mechanism.

(2) When the displacement member 910 is positioned at a displacement end Pmax2 toward the first adjustment mechanism 81, namely, the return spring 18 is contracted to its predefined minimum length, the leading end of the second pin 182 and the base end of the first pin 181 are positioned in the second pinhole 8123 and the leading end of the first pin 181 and the base end of the second pin 183 are positioned in the first pinhole 8114 (see FIG. 9).

As far as the relative arrangement and dimensions of the displacement member 910, the return spring 18, the first pin 181, and the second pins 182, 183 are determined to meet conditions (1) and (2) above, the first roller rocker arm 8110 and the second roller rocker arms 8120, 8130 are separated from each other when the displacement member 910 is positioned at the displacement end Pmax1.

In the above instance, the first roller rocker arm 8110 swings upon receipt of the actuating force of the main cam 70, and the second roller rocker arms 8120, 8130 swing upon receipt of the actuating force of the sub-cam 71. As the sub-cam 71 in the present embodiment is a zero-lift cam, the second roller rocker arms 8120, 8130 do not swing in the present embodiment. As a result, the valve halt state in which the intake valve 3 does not open or close prevails.

Meanwhile, when only the first roller rocker arm 8110 swings as described above, the axial center of the first pin 181 does not coincide with the axial centers of the second pins 182, 183. In such an instance, a part of the end face of the first pin 181 needs to abut on a part of the end face of each of the second pins 182, 183. It is therefore assumed that the shapes and dimensions of the end faces of the first pin 181 and the second pins 182, 183 are determined to meet the above-described conditions.

When, on the other hand, the displacement member 910 is displaced to the displacement end Pmax2, the first pin 181 couples the second roller rocker arm 8120 to the first roller rocker arm 8110 and the second pin 183 couples the first roller rocker arm 8110 to the second roller rocker arm 8130.

As far as the first roller rocker arm 8110 and the second roller rocker arms 8120, 8130 are coupled together, the second roller rocker arms 8120, 8130 swing together with the first roller rocker arm 8110 when the first roller rocker arm 8110 swings upon receipt of the actuating force of the main cam 70. As a result, the intake valve 3 opens and closes in accordance with the cam profile of the main cam 70.

Consequently, the intake valve 3 switches between its operation state and halt state when the first actuator 91 axially displaces the pins 181, 182, 183.

Returning now to FIG. 3, the configuration of the second adjustment mechanism 82 will be described. As is the case with the first adjustment mechanism, which has been described earlier, the second adjustment mechanism includes one first roller rocker arm 8210 and a pair of second roller rocker arms 8220, 8230, which are rotatably mounted on the rocker shaft 10.

The first roller rocker arm 8210 corresponds to the first swing member described in Japanese Patent Application No. 2008-122616. A first roller 8211 is rotatably supported by the leading end of the first roller rocker arm 8210. The first roller 8211 is pressed against the main cam 70 by the pressing force of a coil spring 8212 that is mounted on the rocker shaft 10.

The second roller rocker arms 8120, 8130 correspond to the second swing members described in Japanese Patent Application No. 2008-122616. The base end section of the intake valve 3 abuts on the leading ends of the second roller rocker arms 8220, 8230. Second rollers 8221, 8231 are rotatably supported by the second roller rocker arms 8220, 8230, and positioned toward the rocker shaft 10 and away from the abutment portion of the intake valve 3. The second rollers 8221, 8231 are pressed against the sub-cam 71 by the valve spring 30 and/or the lash adjuster 11.

A mechanism for coupling the first roller rocker arm 8210 to the second roller rocker arms 8220, 8230 and uncoupling the first roller rocker arm 8210 from the second roller rocker arms 8220, 8230 (hereinafter referred to as the "second switching mechanism") is configured substantially symmetrically to the first switching mechanism.

Figure 10:
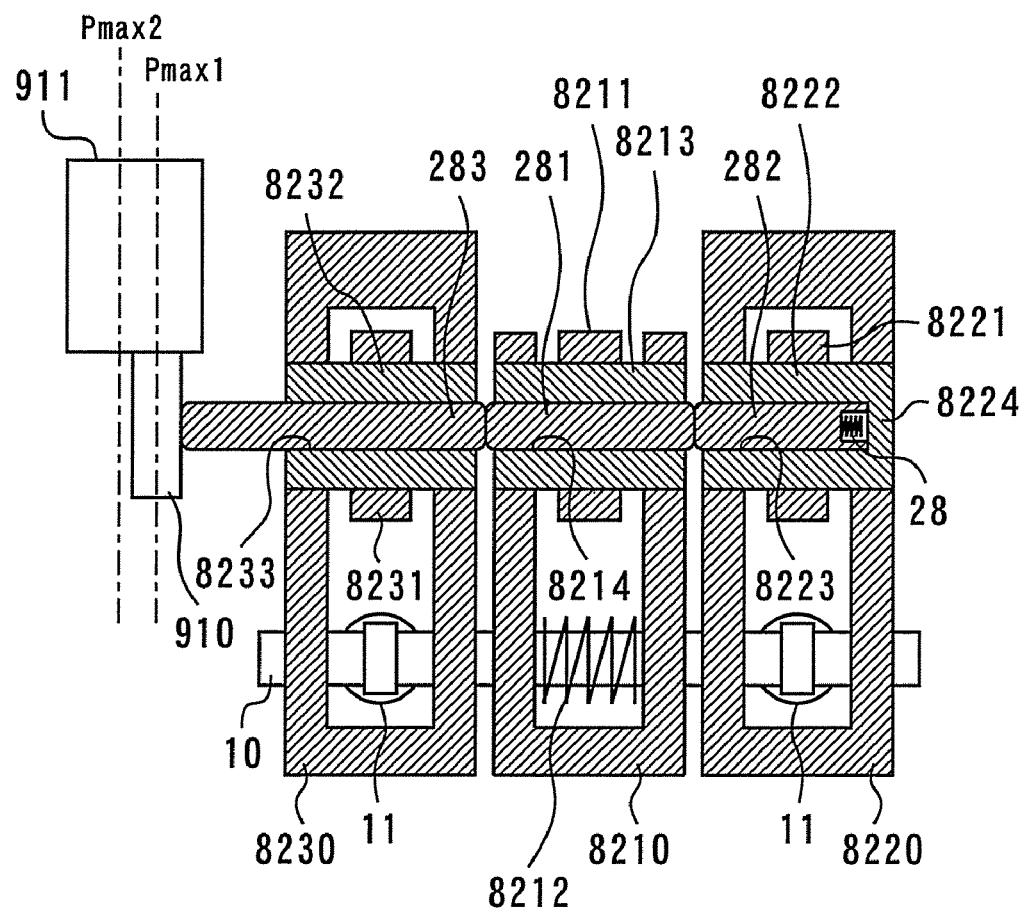
FIG. 10 is a horizontal cross-sectional view of a second adjustment mechanism.

FIG. 10 is a horizontal cross-sectional view of the second adjustment mechanism 82. It is assumed that the first adjustment mechanism 81 is positioned on the left-hand side of FIG. 10.

Referring to FIG. 10, a first pinhole 8214, which is axially extended, is formed in a spindle (first spindle) 8213 for the first roller 8211. Both ends of the first pinhole 8214 are open toward both lateral surfaces of the first roller rocker arm 8210.

A first pin 281, which is cylindrical in shape, is slidably inserted into the first pinhole 8214. The outside diameter of the first pin 281 is substantially equal to the inside diameter of the first pinhole 8214. The first pinhole 8214 has substantially the same axial length as the aforementioned first pinhole 8214.

Second pinholes 8223, 8233, which are axially extended, are formed in spindles (second spindles) 8222, 8232 for the second rollers 8221, 8231. The second pinholes 8223, 8233 have the same inside diameter as the aforementioned first pinhole 8214.

The second pinhole 8223 (the second pinhole positioned opposite the first adjustment mechanism 82 relative to the first roller rocker arm 8110), which is one of the two second pinholes 8223, 8233, is formed so that its end positioned toward the first roller rocker arm 8210 is open while the other end 8224, positioned opposite the first roller rocker arm 8210, is closed (this closed end is hereinafter referred to as the "closed end").

A second pin 282, which is cylindrical in shape, is slidably inserted into the second pinhole 8223. The outside diameter of the second pin 282 is substantially equal to the inside diameter of the second pinhole 8223. The second pin 282 is axially shorter than the second pinhole 8223.

In the second pinhole 8223, a return spring 28 is positioned between the base end of the second pin 282 (this end is positioned toward the closed end 8224) and the closed end 8224. The return spring 28 is a member that presses the second pin 282 toward the first roller rocker arm 8210, and corresponds to the pressing member described in Japanese Patent Application No. 2008-122616.

Both ends of the remaining second pinhole 8233 (the second pinhole positioned toward the first adjustment mechanism 81 relative to the first roller rocker arm 8210), which is one of the two second pinholes 8223, 8233, are open toward both lateral surfaces of the second roller rocker arm 8230, as is the case with the first pinhole. 8214.

A second pin 283, which is cylindrical in shape, is slidably inserted into the second pinhole 8233. The outside diameter of the second pin 283 is equal to the inside diameter of the second pinhole 8233. The second pin 283 is axially longer than the second pinhole 8233.

The relative positions of the above-described three pinholes 8214, 8223, 8233 are determined to meet the same conditions as for the previously described pinholes 8114, 8123, 8133 in the first switching mechanism.

In the second switching mechanism configured as described above, the second pin 282 is constantly pressed toward the first roller rocker arm 8210 by the return spring 28. Therefore, the leading end of the second pin 282 is pressed against the base end of the first pin 281. Accordingly, the leading end of the first pin 281 is pressed against the base end of the second pin 283. As a result, the leading end of the second pin 283 constantly abuts on the displacement member 910 of the first actuator 91.

It is assumed that the relative positions and dimensions of the return spring 28, the first pinhole 8214, and the second pins 282, 283 are determined to meet the following two conditions.

(3) When the displacement member 910 is positioned at the aforementioned displacement end Pmax1, namely, the return spring 28 is contracted to its predefined minimum length, the leading end of the second pin 282 and the base end of the first pin 281 are positioned in the gap between the second roller rocker arm 8220 and the first roller rocker arm 8210 and the leading end of the first pin 281 and the base end of the second pin 283 are positioned in the gap between the first roller rocker arm 8210 and the second roller rocker arm 8230 (see FIG. 10).

Figure 11:
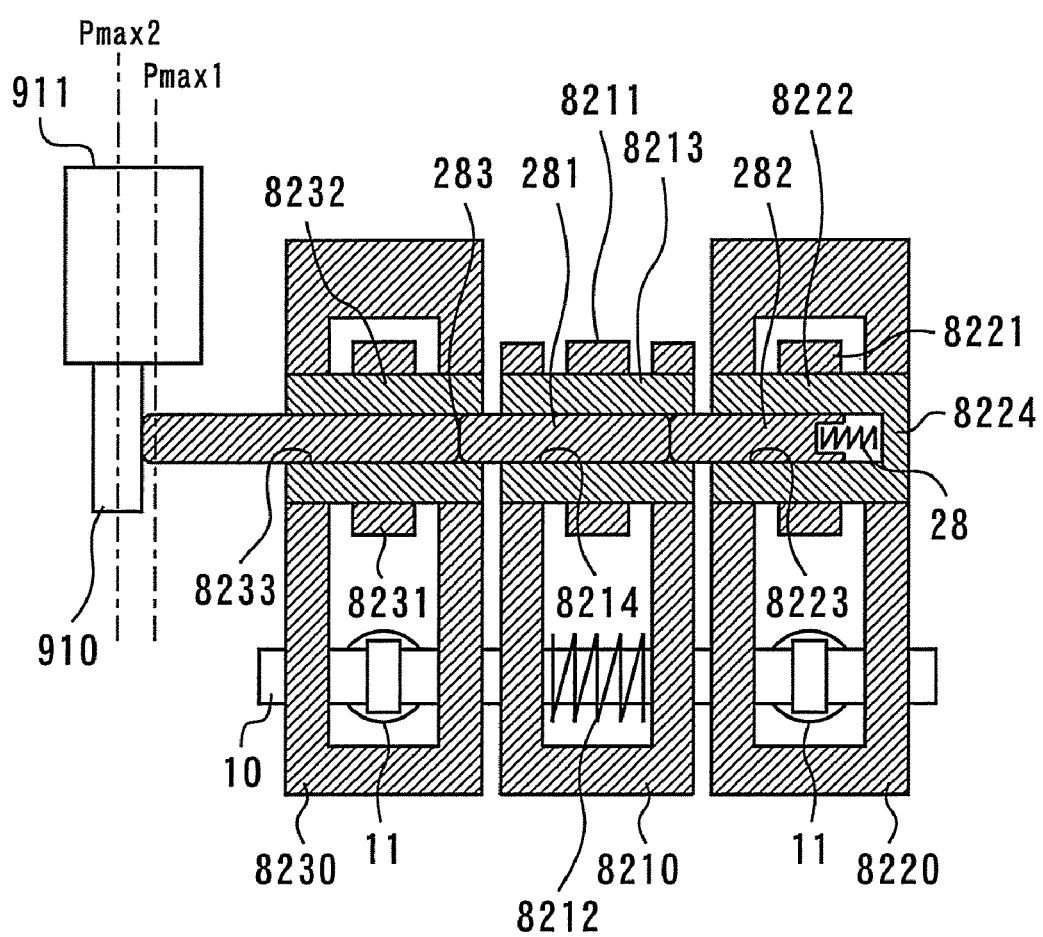
FIG. 11 is a diagram illustrating movement of a second switching mechanism.

(4) When the displacement member 910 is positioned at the aforementioned displacement end Pmax2, namely, the return spring 28 is stretched to its predefined maximum length, the leading end of the second pin 282 and the base end of the first pinhole 8214 are positioned in the first pinhole 8214 and the leading end of the first pinhole 8214 and the base end of the second pin 283 are positioned in the second pinhole 8233 (see FIG. 11).

As far as the relative positions and dimensions of the return spring 28, the first pinhole 8214, and the second pins 282, 283 are determined to meet conditions (3) and (4) above, the first roller rocker arm 8210 and the second roller rocker arms 8220, 8230 are separated from each other, as is the case with the first adjustment mechanism 81, when the displacement member 910 is positioned at the displacement end Pmax1. In this instance, the intake valve 3 is placed in the valve halt state.

In the above instance, it is assumed that the end face shapes and dimensions of the first pin 281 and the second pins 282, 283 are determined in the same manner as for the first switching mechanism.

When, on the other hand, the displacement member 910 is positioned at the displacement end Pmax2, the second pin 282 couples the second roller rocker arm 8220 to the first roller rocker arm 8210 and the second pin 283 couples the first roller rocker arm 8210 to the second roller rocker arm 8230. In other words, when the displacement member 910 is positioned at the displacement end Pmax2, the first roller rocker arm 8210 and the second roller rocker arms 8220, 8230 are coupled to each other. In this instance, the intake valve 3 opens and closes in accordance with the cam profile of the main cam 70.

Consequently, the intake valve 3 switches between its operation state and halt state when the first actuator 91 axially displaces the pins 281, 282, 283. In such an instance, the pins 281, 282, 283 correspond to the switching pins described in Japanese Patent Application No. 2008-122616.

Figure 12:
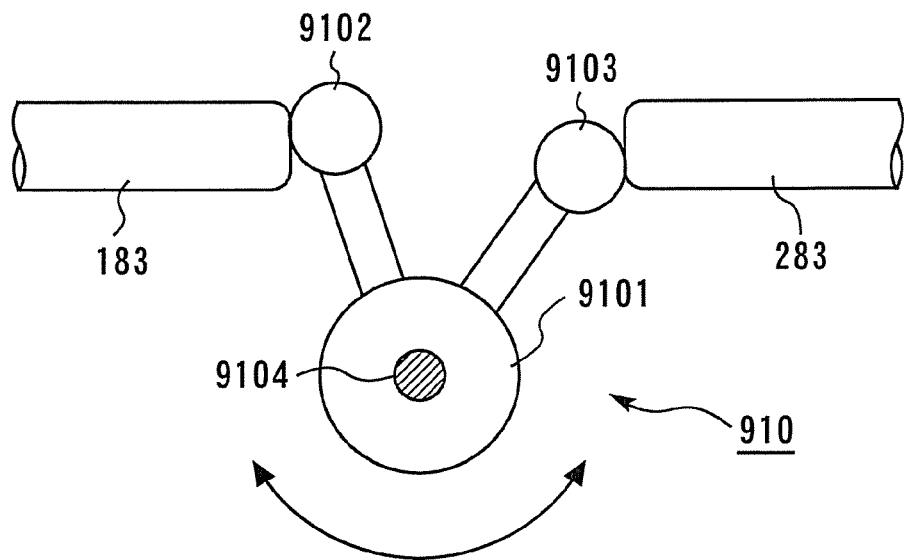
FIG. 12 is a diagram illustrating a first configuration example of a first actuator according to a first example described in Japanese Patent Application No. 2008-122616.

The configuration of the first actuator 91 will now be described in detail. FIG. 12 is a plan view showing the configuration of the displacement member 910.

Referring to FIG. 12, the displacement member 910 includes a rotor 9101, which is rotatably supported by the cylinder head, and two arms 9102, 9103, which are radially extended from the periphery of the rotor 9101.

The leading end of the arm 9102, which is one of the two arms 9102, 9103, abuts on the leading end of the second pin 183 for the first adjustment mechanism 81. The leading end of the other arm 9103, which is one of the two arms 9102, 9103, abuts on the leading end of the second pin 283 for the second adjustment mechanism 82.

As the displacement member 910 is configured as described above, the leading ends of the two arms 9102, 9103 axially displace the second pins 183, 283 when the rotor 9101 rotates.

In the above instance, the drive section 911 is supposed to rotate a shaft 9104 of the rotor 9101. For example, an electric motor may be used as the drive section 911.

Figure 13:
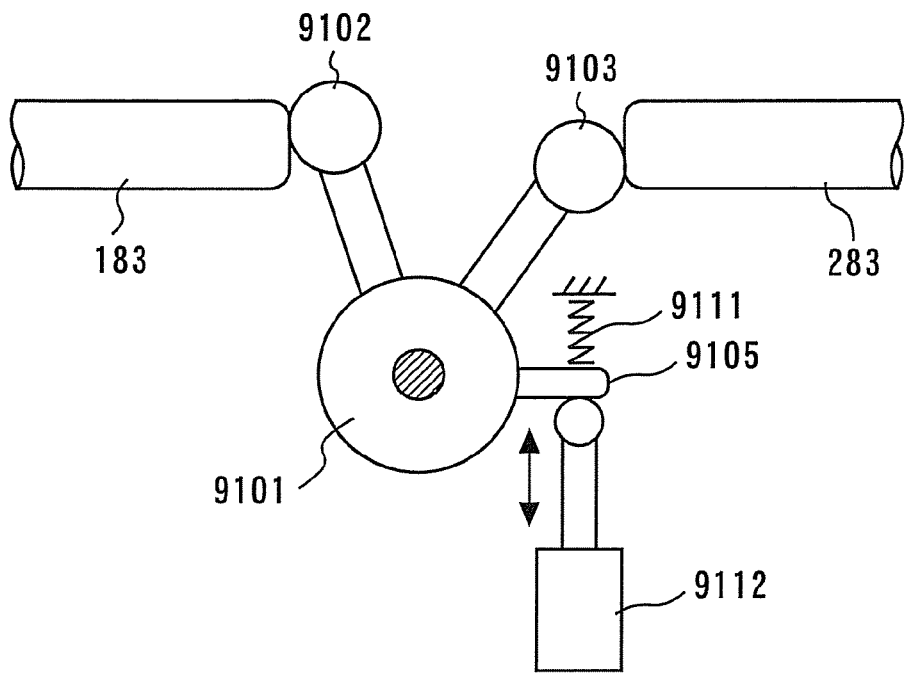
FIG. 13 is a diagram illustrating a second configuration example of a first actuator according to a first example described in Japanese Patent Application No. 2008-122616.

Alternatively, the drive section 911 may, for instance, include a spring 9111 and a solenoid 9112, as shown in FIG. 13. The spring 9111 presses a drive arm 9105 attached to the rotor 9101 in one direction of rotation. The solenoid 9112 pushes the drive arm 9105 in a direction opposite to the direction in which the spring 9106 presses the drive arm 9105.

The spring 9111 may be omitted when the pressing force of the return spring 18 for the first switching mechanism is greater than that of the return spring 28 for the second switching mechanism.

A cylindrical body 9106 may alternatively be used as the displacement member 910. The cylindrical body 9106 is supported between the second pin 183 for the first adjustment mechanism 81 and the second pin 283 for the second adjustment mechanism 82 as shown in FIG. 14 and allowed to move forward and backward in axial direction.

The use of the above-described displacement member 910 (9106) reduces the motive power required of the drive section 911 because no sliding resistance occurs between the displacement member 910 (9106) and the second pins 183, 283 when the displacement member 910 (9106) becomes displaced.

Figure 14:
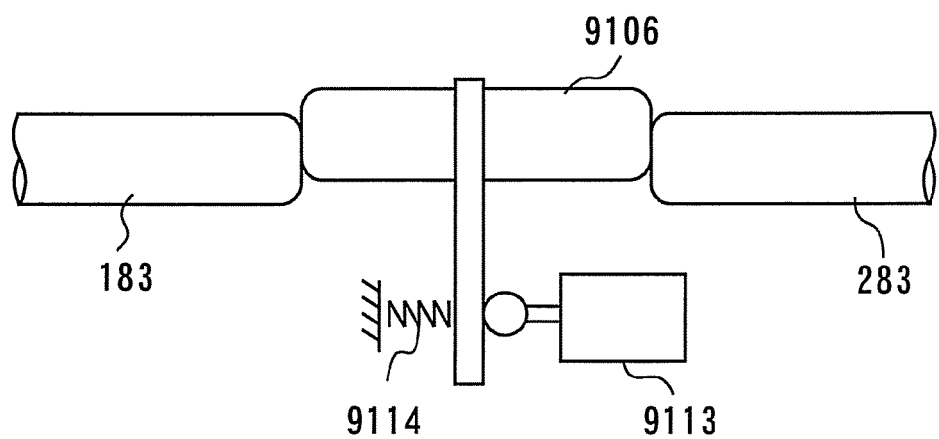
FIG. 14 is a diagram illustrating a third configuration example of a first actuator according to a first example described in Japanese Patent Application No. 2008-122616.

The drive section 911 suitable as the displacement member 910 shown in FIG. 14 may, for instance, include a spring 9114, which presses the cylindrical body 9106 toward the second adjustment mechanism 82, and a solenoid 9113, which pushes the cylindrical body 9106 toward the first adjustment mechanism 81. In this case, too, the spring 9114 may be omitted when the pressing force of the return spring 18 for the first switching mechanism is greater than that of the return spring 28 for the second switching mechanism.

For example, an electric motor coupled to the cylindrical body 9106 via a rack mechanism may alternatively be used as the drive section 911.

According to the first adjustment group, which has been described above, the two adjustment mechanisms 81, 82 can be driven by one actuator 91. In such an instance, the first actuator 91 is supposed to slightly displace the switching pins. Therefore, the valve opening characteristics of the intake valves 3 for two cylinders 21, 22 can be immediately changed. Further, as the mass of the switching pins is small, the first actuator 91 can displace the switching pins with small motive power.

When configured the same as the first adjustment group, the second adjustment group provides the same advantages as the first adjustment group. As a result, it is possible to reduce the size and weight of an entire valve system in a suitable manner.

Figure 15:
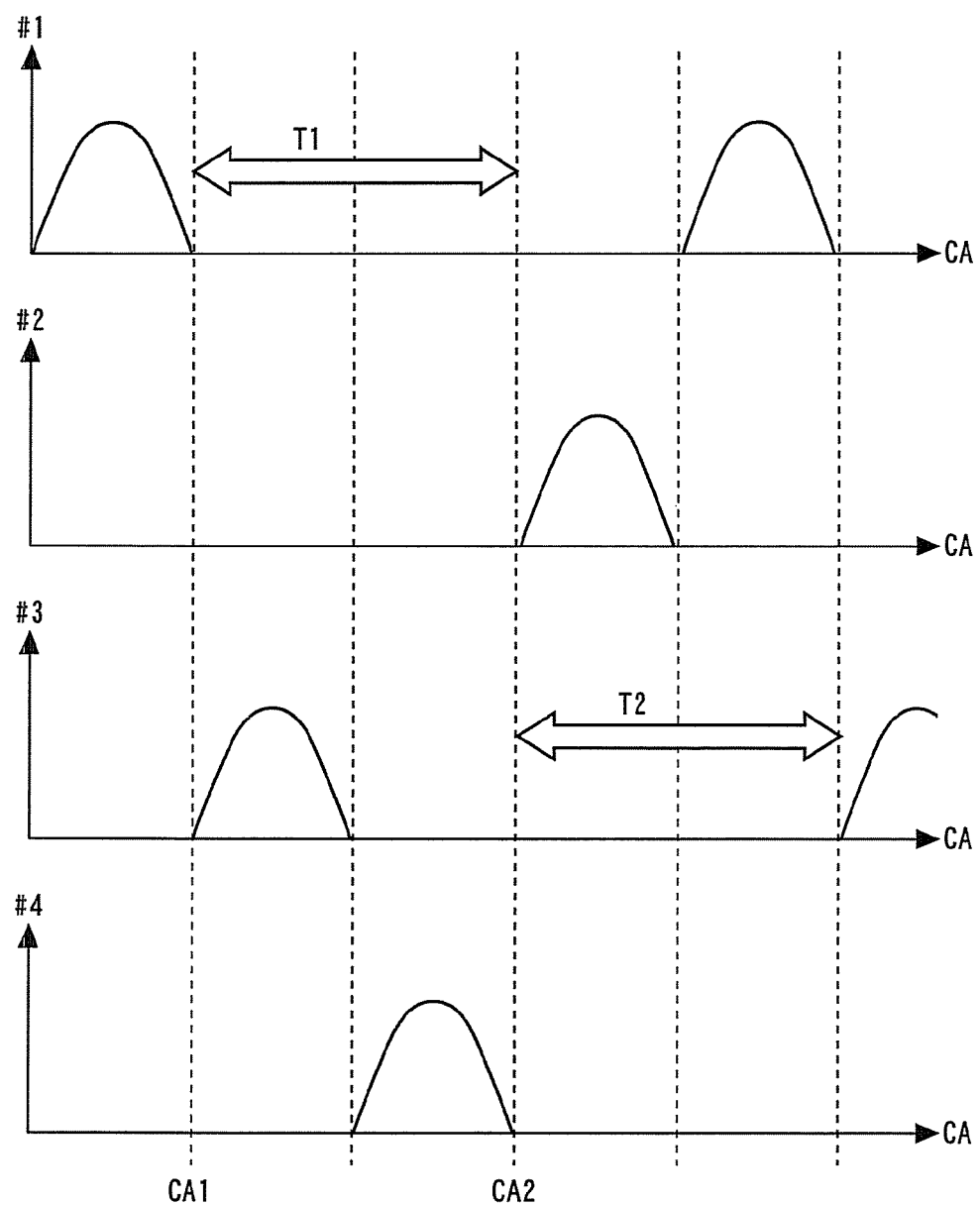
FIG. 15 is a diagram illustrating operating timing of a first actuator and a second actuator.
Figure 16:
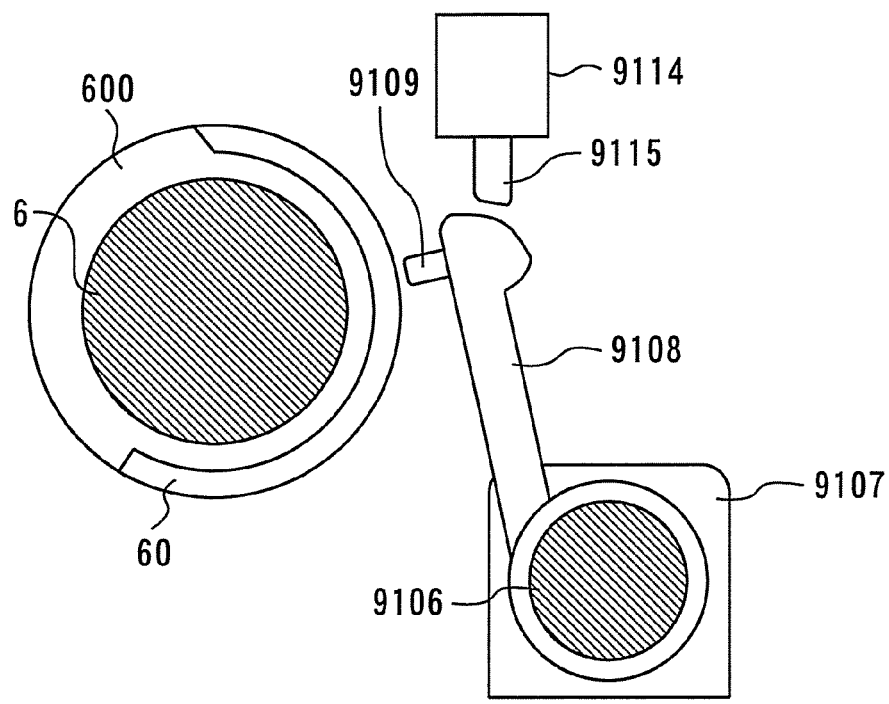
FIG. 16 is a vertical cross-sectional view of a configuration example of a first actuator according to a second example described in Japanese Patent Application No. 2008-122616.
Figure 17:
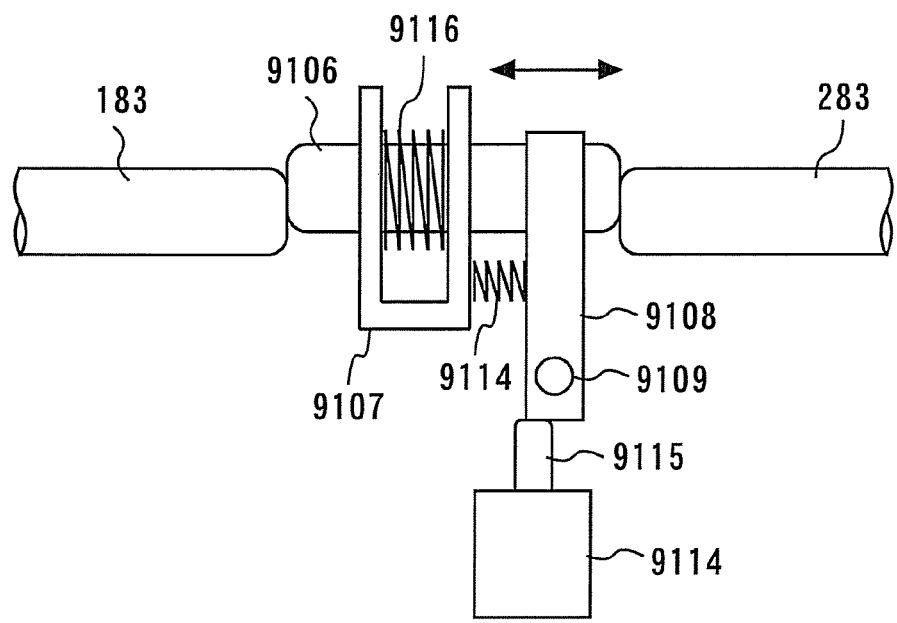
FIG. 17 is a plan view of a configuration example of a first actuator according to a second example described in Japanese Patent Application No. 2008-122616.
Figure 18:
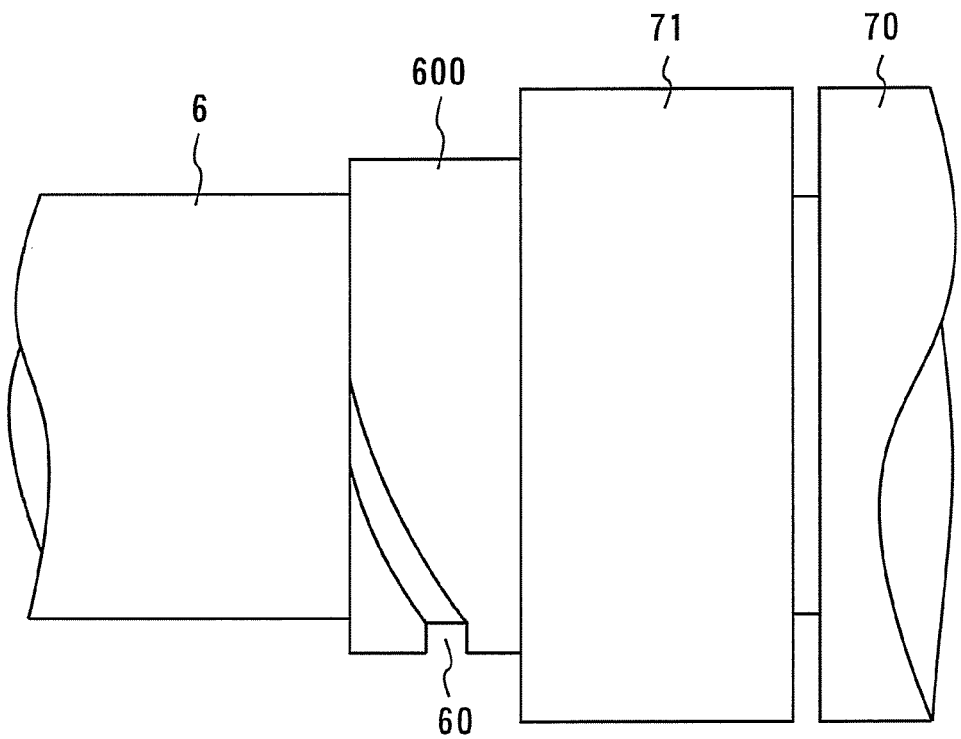
FIG. 18 is a diagram illustrating a configuration of an intake camshaft according to a second example described in Japanese Patent Application No. 2008-122616.

A control method that the ECU 100 uses to control the first actuator 91 and the second actuator 92 will now be described with reference to FIG. 15.

It is necessary that the above-described switching pin displacement take place when the axial center of the first pinhole aligns with the axial center of the second pinhole. In other words, switching pin displacement needs to take place while the first roller rocker arm is not swinging.

For example, the ECU 100 controls the first actuator 91 so that switching pin displacement occurs during a base circle period T1 of the main cam 70 for the first cylinder (#1) 21 and the second cylinder (#2) 22 (during a period during which the base circle of the main cam 70 abuts on the first rollers 8111, 8211).

In the above instance, the ECU 100 preferably controls the first actuator 91 so that switching pin displacement starts at the beginning or immediately after the beginning of the base circle period T1.

More specifically, the ECU 100 should activate the first actuator 91 when the output signal of the crank position sensor 101 agrees with a crank angle CA1 prevailing at the beginning of the base circle period T1. The above crank angle CA1 can be predetermined by way of experiment.

Similarly, the ECU 100 should activate the second actuator 92 at the beginning CA2 of the base circle period T2 of the main cam 70 for the third cylinder (#3) 23 and the fourth cylinder (#4) 24.

When the ECU 100 controls the first actuator 91 and the second actuator 92 as described above, switching pin displacement can be completed within the base circle periods T1, T2.

The above-described control is preferably exercised, for instance, at the beginning or end of a fuel cut operation for the internal combustion engine 1.

A modified embodiment of the variable valve train according to the first embodiment will now be described. The configuration and basic operation described below are disclosed in Japanese Patent Application No. 2008-122616 as the second embodiment.

The modified embodiment of the variable valve train according to the first embodiment will be described with reference to FIGS. 16 to 22. Only the difference between the configuration of the modified embodiment and the configuration of the first embodiment will be described. The similarities between the above two embodiments will not be redundantly described.

The valve system according to the modified embodiment described here is characterized by the configurations of the actuators 91, 92. More specifically, the actuators 91, 92 according to the modified embodiment use the turning force of the intake camshaft 6 to invoke switching pin displacement described earlier.

First of all, the configurations of the actuators 91, 92 according to the modified embodiment will be described with reference to FIGS. 16 to 19. As the first actuator 91 is similar in configuration to the second actuator 92, only the configuration of the first actuator 91 will be described below.

The displacement member 910 for the first actuator 91 includes the cylindrical body 9106 that is positioned between the second pin 183 for the first adjustment mechanism 81 and the second pin 283 for the second adjustment mechanism 82. This cylindrical body 9106 is supported by a carrier 9107, which is fastened to the cylinder head, and allowed to move forward and backward in axial direction and rotate in circumferential direction.

An arm 9108 is mounted on the outer circumferential surface of the cylindrical body 9106 in a standing position. The leading end of the arm 9108 is extended to such a position as to face the circumferential surface of the intake camshaft 6. Further, an insertion/extraction pin 9109 is formed on the leading end of the arm 9108.

A large-diameter section 600 having a larger diameter than the intake camshaft 6 is formed on the outer circumferential surface of the intake camshaft 6 that faces the insertion/extraction pin 9109. A spiral groove 60, which is extended in circumferential direction, is formed on the circumferential surface of the large-diameter section 600. The width of the spiral groove 60 is slightly greater than the outside diameter of the insertion/extraction pin 9109.

The base end position of the spiral groove 60 in the axial direction of the intake camshaft 6 coincides with the position of the insertion/extraction pin 9109 that prevails when the displacement member 910 is positioned at the aforementioned displacement end Pmax1. Further, the base end position (rotational angular position) of the spiral groove 60 in the circumferential direction (rotation direction) of the intake camshaft 6 coincides with a rotational angular position at which the aforementioned base circle period T1 begins.

On the other hand, the terminal end position of the spiral groove 60 in the axial direction of the intake camshaft 6 coincides with the position of the insertion/extraction pin 9109 that prevails when the displacement member 910 is positioned at the aforementioned displacement end Pmax2. Further, the terminal end position of the spiral groove 60 in the circumferential direction of the intake camshaft 6 is before a rotational angular position at which the aforementioned base circle period T1 ends.

The drive section 911 for the first actuator 91 includes a solenoid 9114, which inserts the insertion/extraction pin 9109 into the spiral groove 60; an extraction spring 9116, which extracts the insertion/extraction pin 9109 from the spiral groove 60; and the spring 9114, which presses the cylindrical body 9106 toward the second adjustment mechanism 82 (toward the displacement end Pmax1).

The solenoid 9114 is positioned so that a drive shaft 9115 of the solenoid 9114 can press the rear surface of the leading end of the arm 9108 (the surface opposing a surface on which the insertion/extraction pin 9109 is mounted) toward the large-diameter section 600.

Figure 19:
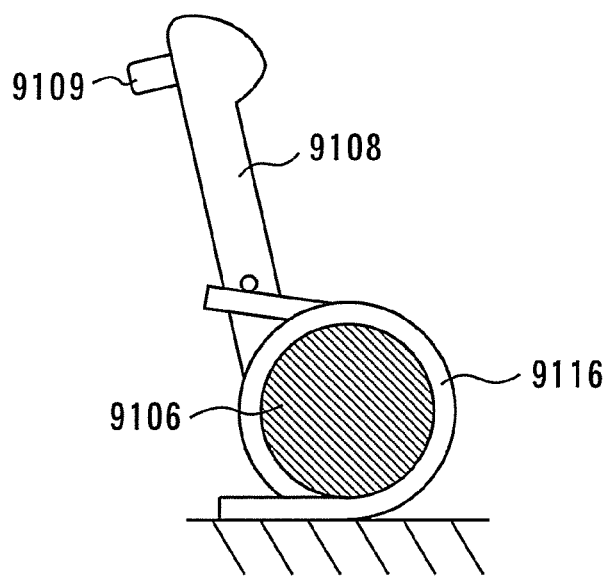
FIG. 19 is a diagram illustrating a configuration example of an extraction spring according to a second example described in Japanese Patent Application No. 2008-122616.

The extraction spring 9116 is positioned so as to be able to press the cylindrical body 9106 in the direction of separating the leading end of the arm 9108 from the large-diameter section 600. In the present embodiment, the extraction spring 9116 is wound around the cylindrical body 9106 as shown in FIG. 19. One end of the extraction spring 9116 is fastened to the arm 9108, whereas the other end is fastened to the cylinder head or carrier 9107.

Figure 20:
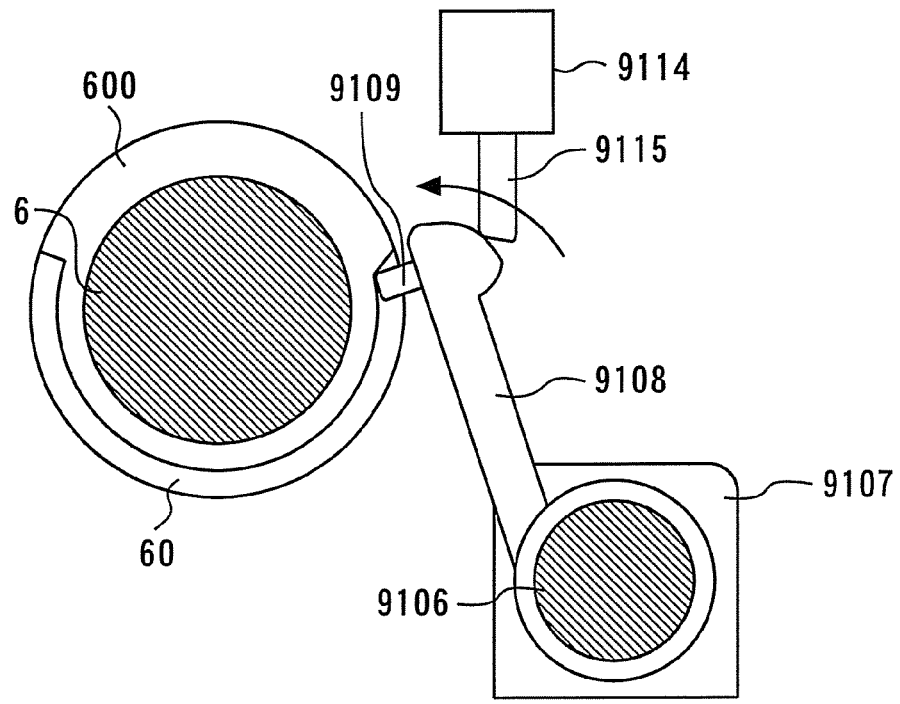
FIG. 20 is a first diagram illustrating movement of a first actuator according to a second example described in Japanese Patent Application No. 2008-122616.
Figure 21:
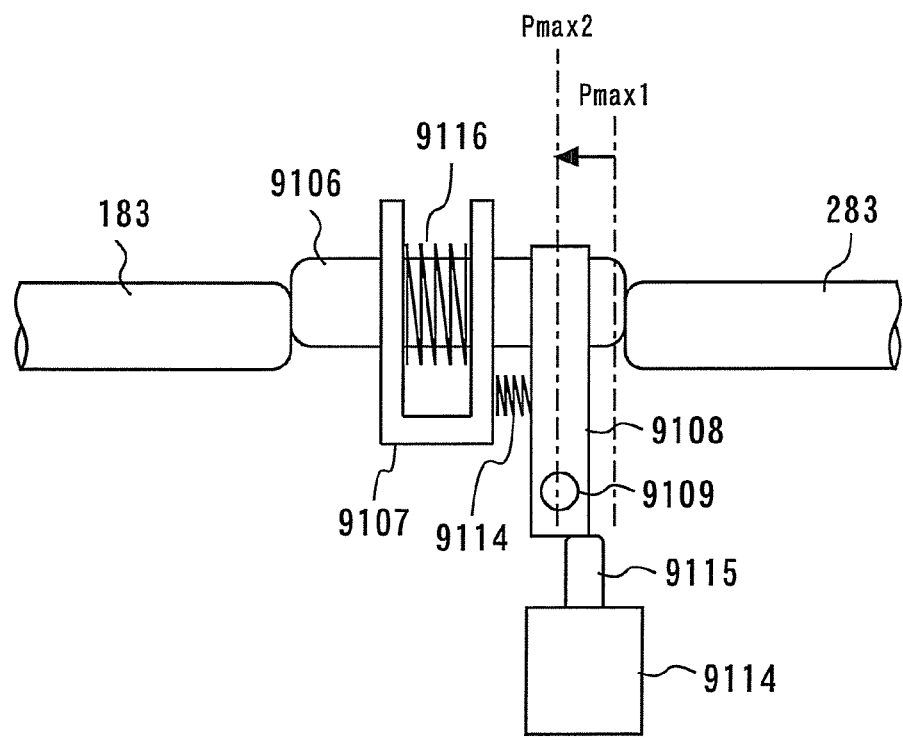
FIG. 21 is a second diagram illustrating movement of a first actuator according to a second example described in Japanese Patent Application No. 2008-122616.
Figure 22:
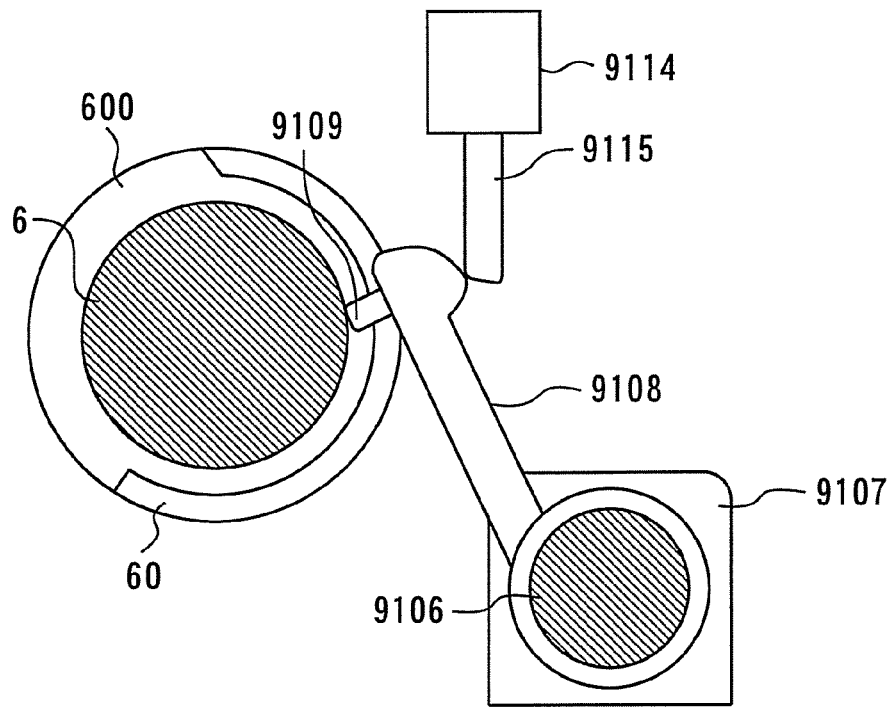
FIG. 22 is a third diagram illustrating movement of a first actuator according to a second example described in Japanese Patent Application No. 2008-122616.

The operation of the first actuator 91 will now be described with reference to FIGS. 20 to 22.

First of all, when the solenoid 9114 is not operated, the pressing force of the extraction spring 9116 causes the insertion/extraction pin 9109 to leave the spiral groove 60. In this instance, the cylindrical body 9106 and the arm 9108 receive the pressing force of the spring 9114 and are positioned at the aforementioned displacement end Pmax1.

When the ECU 100 operates the solenoid 9114, the drive shaft 9115 of the solenoid 9114 presses the leading end of the arm 9108 against the large-diameter section 600. In this instance, the base end position of the spiral groove 60 in the axial direction of the intake camshaft 6 coincides with the position of the insertion/extraction pin 9109. When the position of the spiral groove 60 in the rotation direction of the intake camshaft 6 coincides with the position of the insertion/extraction pin 9109 (that is, when the rotation angle of the crankshaft coincides with the beginning CA1 of the base circle period T1), the insertion/extraction pin 9109 is inserted into the spiral groove 60 (see FIG. 20).

When the insertion/extraction pin 9109 is inserted into the spiral groove 60, the position of the insertion/extraction pin 9109 in the axial direction of the intake camshaft 6 is displaced along the spiral groove 60. Accordingly, the axial position of the cylindrical body 9106 is displaced from the displacement end Pmax1 toward the displacement end Pmax2. When the insertion/extraction pin 9109 subsequently reaches the terminal end of the spiral groove 60, the cylindrical body 9106 arrives at the displacement end Pmax2 (see FIG. 21).

Meanwhile, after the insertion/extraction pin 9109 reaches the terminal end of the spiral groove 60, the cylindrical body 9106 may receive the pressing force of the spring 9114 and return from the displacement end Pmax2 to the displacement end Pmax1.

As such being the case, the insertion/extraction pin 9109 may be designed to fall onto the circumferential surface of the intake camshaft 6 from the large-diameter section 600 when the insertion/extraction pin 9109 arrives at the terminal end of the spiral groove 60. In such an instance, a lateral surface of the insertion/extraction pin 9109 abuts on a bump between the circumferential surface of the intake camshaft 6 and the circumferential surface of the large-diameter section 600. As a result, the position of the cylindrical body 9106 is maintained at the displacement end Pmax2.

When the cylindrical body 9106 is to be displaced from the displacement end Pmax2 to the displacement end Pmax1, the solenoid 9114 should move the drive shaft 9115 backward. In such an instance, the extraction spring 9116 disengages the insertion/extraction pin 9109 from the bump; therefore, the cylindrical body 9106 receives the pressing force of the spring 9114 and becomes displaced from the displacement end Pmax2 to the displacement end Pmax1.

As the first actuator 91, which has been described above, merely has to generate motive power for pressing the insertion/extraction pin 9109, the rating of the first actuator 91 can be reduced.

Figure 23:
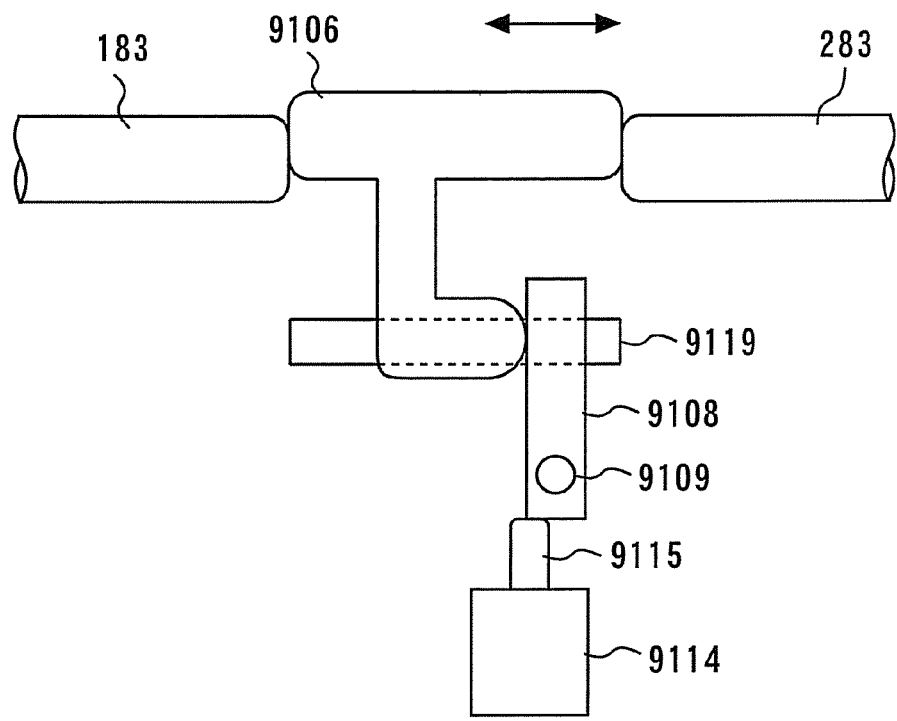
FIG. 23 is a diagram illustrating other configuration example of a first actuator according to a second example described in Japanese Patent Application No. 2008-122616.

The above description assumes that the cylindrical body 9106 doubles as a rotation shaft for the arm 9108. Alternatively, however, the arm 9108 may be supported by a rotation shaft 9119 that is independent of the cylindrical body 9106, as shown in FIG. 23.

The embodiments described above assume that the internal combustion engine 1 has four in-line cylinders. However, the present invention does not limit the number and the arrangement of cylinders of an internal combustion engine.

Further, the number of intake valves and the number of exhaust valves are not limited to two per cylinder. The present invention is applicable to an internal combustion engine that includes at least one intake valve or exhaust valve per cylinder.

Moreover, the embodiments described above assume that one actuator drives the adjustment mechanisms for two cylinders. However, one actuator can drive the adjustment mechanisms for three or more cylinders as far as their base circle periods overlap with each other.

The valve drive mechanism may alternatively be configured so that the intake and exhaust valves for individual cylinders of the internal combustion engine are driven and halted at timings that differ from one cylinder to another. The above-described valve drive mechanism causes the first actuator to displace the switching pin for switching the valves of the first and second cylinders between the driven state and the halt state, and causes the second actuator to displace the switching pin for switching the valves of the third and fourth cylinders between the driven state and the halt state. The above-mentioned alternative configuration provides a valve operation switching pin for each of the first to fourth cylinders, and uses different actuators to displace such switching pins independently. More specifically, the valve drive mechanism may be configured to include a total of four actuators that displace the switching pins of the cylinders on an individual basis. The use of this alternative configuration makes it possible to exercise control for driving and halting the intake and exhaust valves at desired timings that differ from one cylinder to another.

The invention claimed is:

1. An abnormality detection device for detecting an abnormality in an internal combustion engine having a knock sensor and a valve drive mechanism for driving an intake valve and an exhaust valve, the knock sensor being capable of sensing a seating sound of the intake valve and/or the exhaust valve, the valve drive mechanism being capable of halting at least one of the intake valve and the exhaust valve, the abnormality detection device comprising:
   instruction detection means for detecting whether a control signal issued to the valve drive mechanism is a valve drive signal or a valve halt signal; and
   judgment means for judging, in accordance with the result of detection by the instruction detection means and the presence of the seating sound in an output of the knock sensor, whether or not the valve drive mechanism is abnormal.

2. The abnormality detection device for the internal combustion engine according to claim 1, wherein the internal combustion engine includes a plurality of cylinders equipped with an ignition plug, the abnormality detection device further comprising:
   ignition control means for changing the ignition timing of the ignition plug or inhibiting the ignition of the ignition plug so that the seating timings of the intake valve and the exhaust valve do not coincide with the ignition timing of the ignition plug; and
   output acquisition means for acquiring the output of the knock sensor after the ignition control means changes the ignition timing or inhibits the ignition;

wherein the judgment means judges, in accordance with the presence of the seating sound in the knock sensor output acquired by the output acquisition means, whether or not the valve drive mechanism is abnormal.

3. The abnormality detection device for the internal combustion engine according to claim 1, wherein the internal combustion engine includes a plurality of intake valves and a plurality of exhaust valves, the valve drive mechanism being a variable valve train capable of changing the valve opening characteristics of the plurality of intake valves and the plurality of exhaust valves, the abnormality detection device further comprising:

phase change means for changing the phase of a valve so that the seating timings of the plurality of intake valves and the plurality of exhaust valves do not coincide with each other; and output acquisition means for acquiring the output of the knock sensor after the phase change means changes the phase;

wherein the judgment means judges, in accordance with the presence of the seating sound in the knock sensor output acquired by the output acquisition means, whether or not the valve drive mechanism is abnormal.

4. The abnormality detection device for the internal combustion engine according to claim 3, wherein the phase change means includes seating timing adjustment means, which adjusts the seating timings of two of the plurality of intake valves and the plurality of exhaust valves that are close to each other in terms of seating timing until the seating timing difference between the two valves is greater than a predetermined amount.

5. The abnormality detection device for the internal combustion engine according to claim 1, further comprising:

periodic output acquisition means for acquiring the knock sensor output generated at the seating timing of the intake valve and/or the exhaust valve at a plurality of timings that differ from each other by a crank angle equivalent to an integer multiple of one cycle; and comparative detection means for determining the presence of the seating sound in a knock sensor output by comparing knock sensor outputs that are acquired by the periodic output acquisition means device at a plurality of timings.

6. The abnormality detection device for the internal combustion engine according to claim 5, wherein the valve drive mechanism includes a camshaft that rotates in synchronism with a crankshaft of the internal combustion engine, and a cam mechanism that transmits the rotation of the camshaft to open or close the intake valve and the exhaust valve.

7. The abnormality detection device for the internal combustion engine according to any one of claim 1, wherein the internal combustion engine includes a plurality of cylinders each having an intake valve and an exhaust valve, and wherein the judgment means device determines the presence of the seating sound by comparing the knock sensor output against a predetermined threshold value, the abnormality detection device further comprising:

threshold value storage means for storing a plurality of different threshold values for judgment by the judgment means; and threshold value selection means for selecting threshold values for judgment by the judgment means from the plurality of threshold values stored by the threshold value storage means in a manner appropriate for the individual intake valves and exhaust valves of each of the plurality of cylinders.

8. The abnormality detection device for the internal combustion engine according to claim 1, further comprising:

learning means which, while at least one of the intake valve and exhaust valve is being driven by the valve drive mechanism, acquires a learned value by learning the maximum amplitude of an output waveform of the knock sensor at a valve closing timing of the at least one driven valve;

wherein the judgment means determines the presence of the seating sound of the intake valve and the presence of the seating sound of the exhaust valve by comparing the knock sensor output value against the learned value.

9. The abnormality detection device for the internal combustion engine according to claim 8, wherein the internal combustion engine includes a valve group having a plurality of intake valves and a plurality of exhaust valves; wherein the valve drive mechanism is capable of halting the drive of the individual valves in the valve group; wherein the learning means acquires learned values concerning the individual valves in the valve group; and wherein the judgment means checks each valve in the valve group for the presence of the seating sound in the knock sensor output by comparing the knock sensor output against a plurality of learned values that are acquired when the learning means learns each valve.

10. An internal combustion engine comprising:

a valve drive mechanism which is capable of driving an intake valve and an exhaust valve of the internal combustion engine, receiving a valve drive signal and a valve halt signal, and halting the drive of at least one of the intake valve and the exhaust valve in accordance with the received signals;

a knock sensor which is incorporated in the internal combustion engine to sense the seating sound of the intake valve and/or the exhaust valve;

fuel cut means which performs a fuel cut for the internal combustion engine;

valve halt control means which selectively inputs the valve drive signal and the valve halt signal into the valve drive mechanism so as to keep the intake valve and/or the exhaust valve closed during the fuel cut;

the abnormality detection device for the internal combustion engine according to claim 1; and abnormality detection control means which causes the abnormality detection device to check for an abnormality in the valve drive mechanism after the valve halt signal is input into the valve drive mechanism by the valve halt control means.

11. An internal combustion engine comprising:

a valve drive mechanism which is capable of driving an intake valve and an exhaust valve of the internal combustion engine, receiving a valve drive signal and a valve halt signal, and halting the drive of at least one of the intake valve and the exhaust valve in accordance with the received signals;

a knock sensor which is incorporated in the internal combustion engine to sense the seating sound of the intake valve and/or the exhaust valve;

fuel cut means which performs a fuel cut for the internal combustion engine;

valve halt control means which inputs the valve halt signal into the valve drive mechanism so as to keep the intake valve and/or the exhaust valve closed during the fuel cut;

valve restoration control means which, upon receipt of a fuel cut termination instruction, inputs the valve drive signal into the valve drive mechanism so that the intake valve and/or the exhaust valve resume a valve opening operation;

the abnormality detection device for the internal combustion engine according to claim 1; and abnormality detection control means which causes the abnormality detection device to check for an abnormality in the valve drive mechanism during a period after the valve drive signal is input into the valve drive mechanism by the valve restoration control means and before the internal combustion engine resumes a fuel injection operation.

\* \* \* \* \*